United States Patent
Nelson

[11] 3,956,587
[45] May 11, 1976

[54] FACSIMILE APPARATUS

[75] Inventor: Richard L. Nelson, New York, N.Y.

[73] Assignee: Exxon Research and Engineering Company, Linden, N.J.

[22] Filed: Nov. 5, 1973

[21] Appl. No.: 412,989

Related U.S. Application Data

[63] Continuation-in-part of Ser. No. 333,615, Feb. 20, 1973, abandoned.

[52] U.S. Cl. ............................ 178/7.6; 178/DIG. 2; 264/1; 264/26; 350/96 B; 355/1
[51] Int. Cl.² .......................................... H04N 1/24
[58] Field of Search ............... 178/6, DIG. 27, 7.1, 178/7.6, DIG. 2; 350/96 B, 96 R; 355/1

[56] References Cited
UNITED STATES PATENTS

| | | | |
|---|---|---|---|
| 3,659,935 | 5/1972 | Moraw | 355/1 |
| 3,726,998 | 4/1973 | Szpak | 178/7.6 |
| 3,735,040 | 5/1973 | Punt | 178/DIG. 27 |
| 3,739,095 | 6/1973 | Alden | 178/DIG. 2 |
| 3,758,784 | 9/1973 | Vischulis | 250/227 |
| 3,770,909 | 11/1973 | Rose | 178/DIG. 2 |
| 3,770,910 | 11/1973 | Rose | 178/DIG. 2 |
| 3,786,181 | 1/1974 | Pear | 178/DIG. 2 |
| 3,834,803 | 9/1974 | Tsukada | 355/1 |
| 3,840,701 | 10/1974 | Tomii | 178/DIG. 2 |
| 3,860,747 | 1/1975 | Orii | 178/DIG. 2 |

OTHER PUBLICATIONS

Skan-A-Matic Corp., S-3010-3 Series Bulletin Received Nov. 3, 1972.

*Primary Examiner*—Howard W. Britton
*Attorney, Agent, or Firm*—N. Norris

[57] ABSTRACT

A facsimile transceiver comprising a document/copy receiving drum, a motor for rotation of the drum about the drum axis and a read/write head mounted on a rotating shaft for linear movement in a direction parallel with the drum axis. When the transceiver is operating in the transmitting mode, the information of the original document is scanned by a reading fiber optic carried on the read/write head. Illumination of the document is provided by a light pipe or a plurality of fiber optics which substantially surround the reading fiber optic which extends from the base of a recess in an arcuate surface of the read/write head which rides on the document carried by the drum. The arcuate surface has a portion with a radius of curvature substantially equal to the radius of curvature of the drum in the vicinity of the reading fiber optic and portions spaced from the reading fiber optic with radii of curvature substantially larger so as to prevent undesirable bouncing of the head as a discontinuity in document thickness passes between the read/write head and the drum.

72 Claims, 33 Drawing Figures

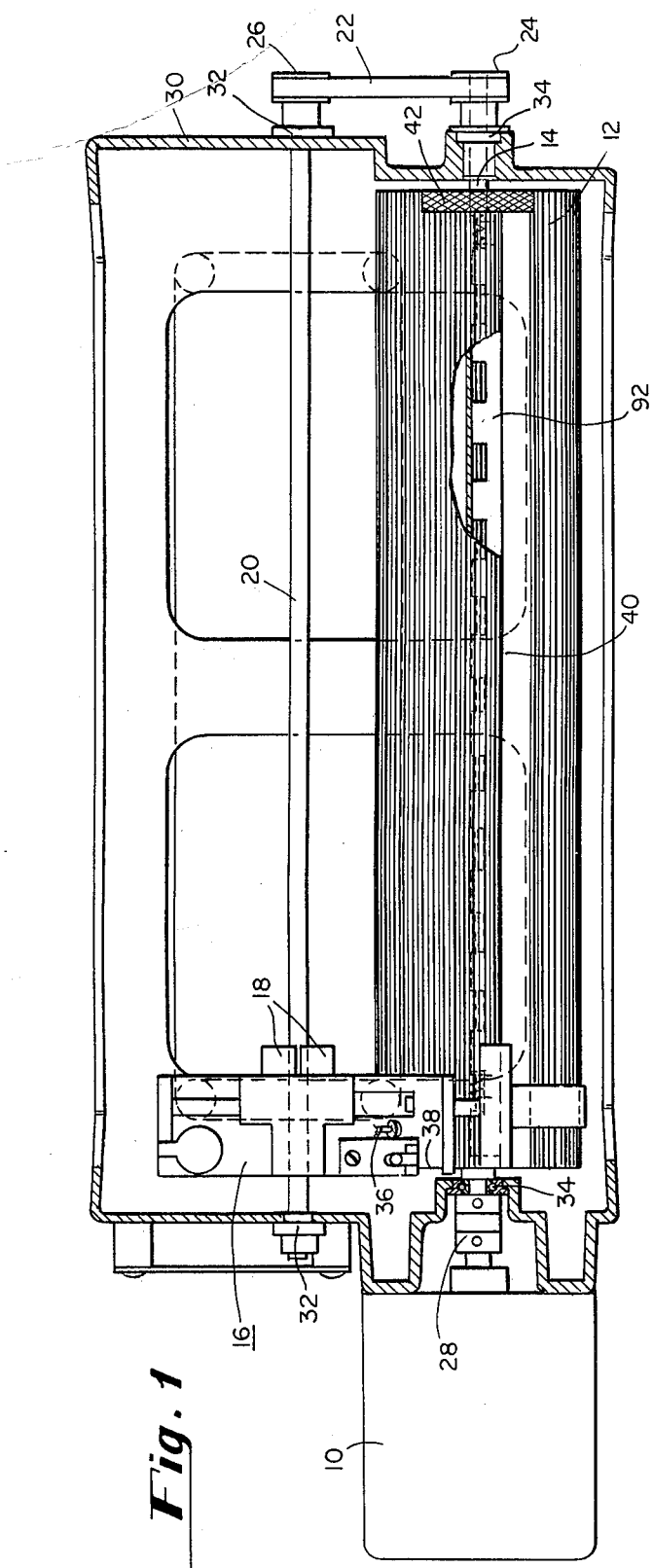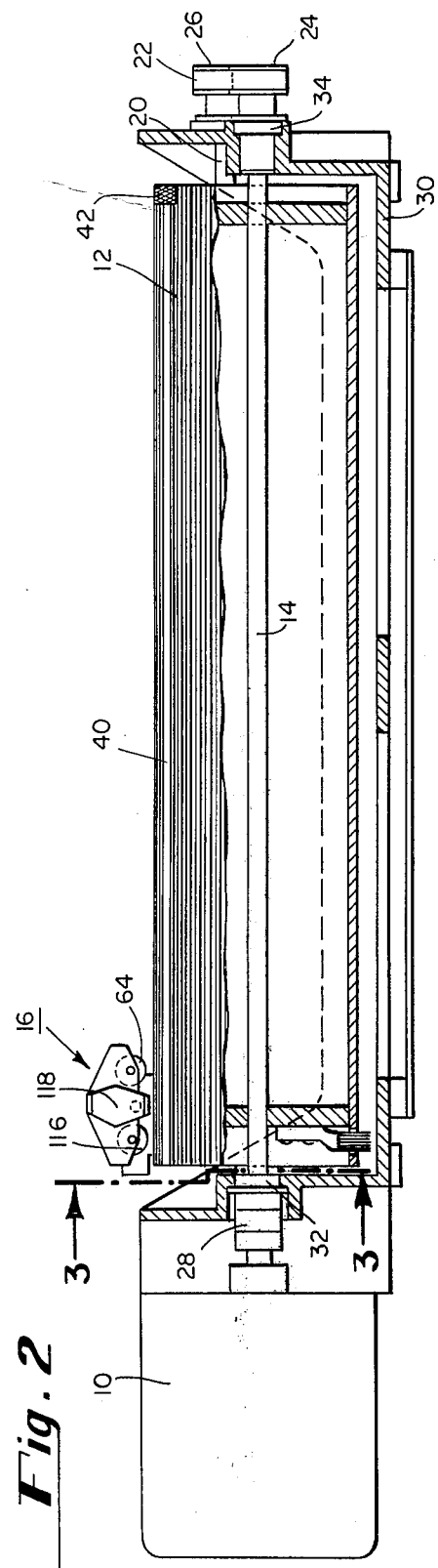

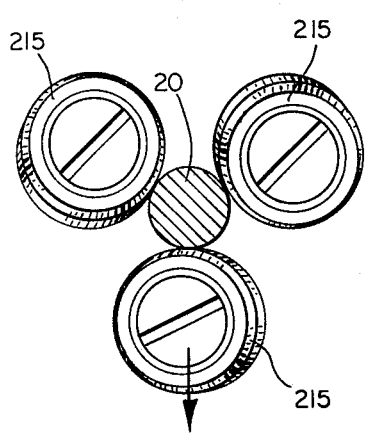
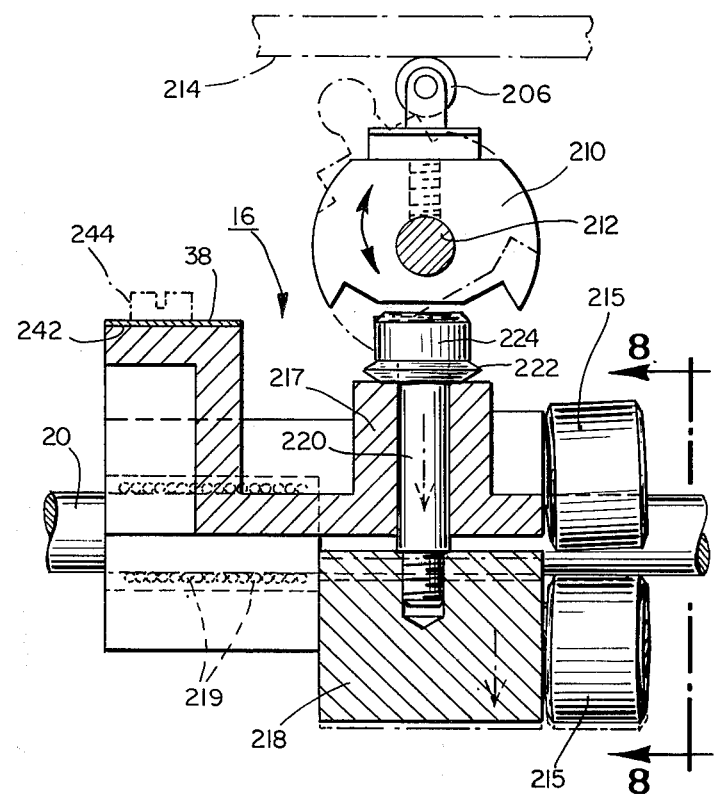
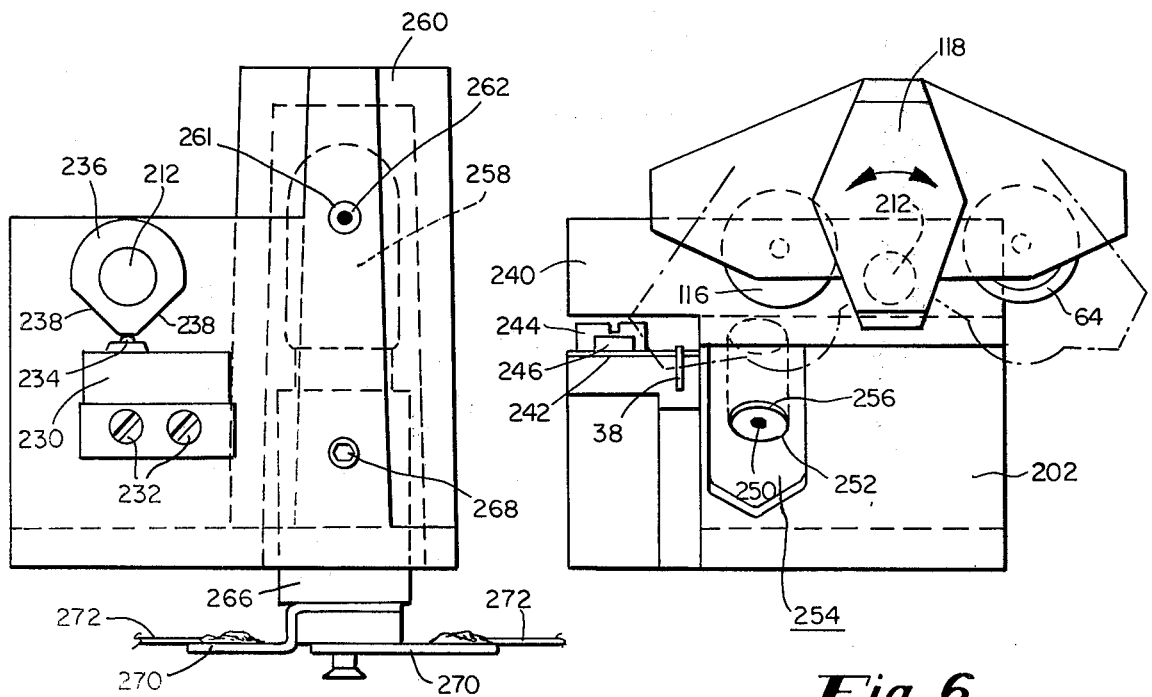

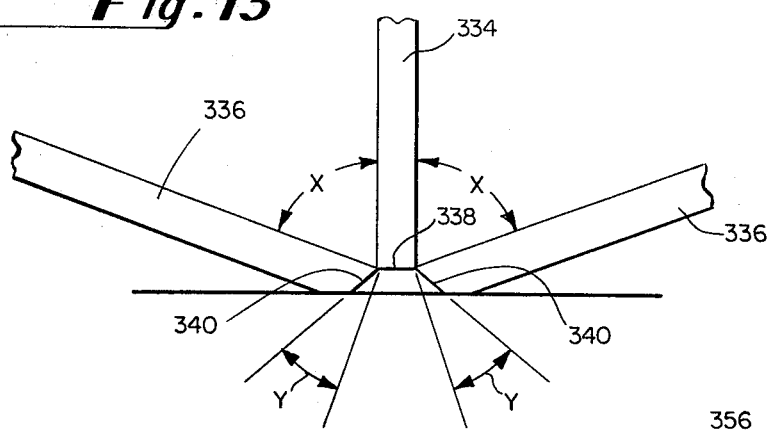
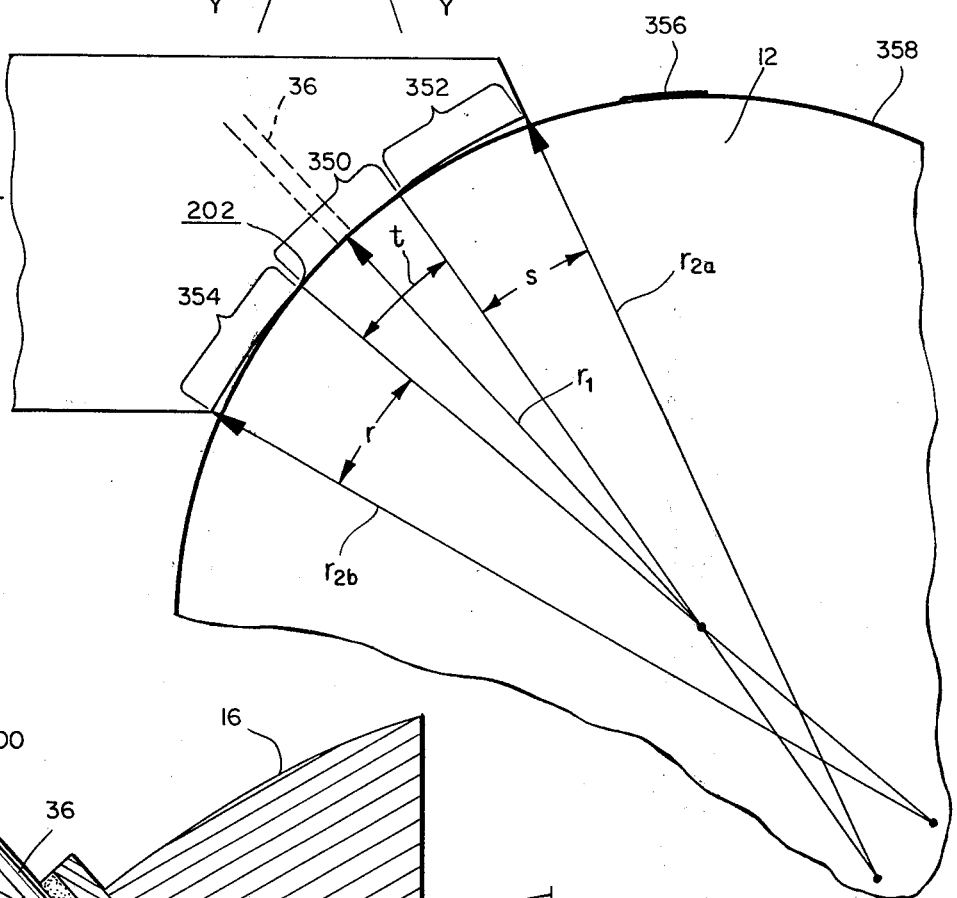
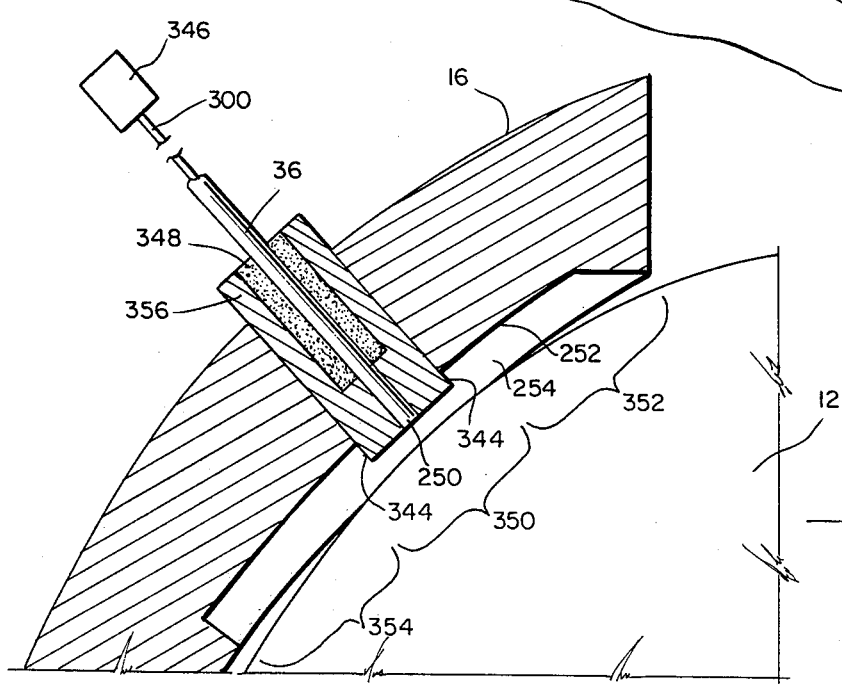

FACSIMILE APPARATUS

RELATED APPLICATIONS

This is a continuation-in-part of application Ser. No. 333,615 filed Feb. 20, 1973, now abandoned, and incorporated herein by reference.

Certain aspects of the facsimile apparatus disclosed herein are also disclosed in my copending application Ser. No. 333,616 filed Feb. 20, 1973, now U.S. Pat. No. 3,872,239, a copending application of Luther R. Winters, Jr., Ser. No. 333,927 filed Feb. 16, 1973, now U.S. Pat. No. 3,872,248, and a copending application of Herbert P. Ford, Jr., Ser. No. 332,925 filed Feb. 16, 1973, now U.S. Pat. No. 3,859,459, all of which are assigned to the assignee of the invention.

BACKGROUND OF THE INVENTION

This invention relates to facsimile systems comprising a transmitter, a receiver and a communications network such as telephone lines therebetween. The transmitter employs a scanning or reading element which reads the information content of an original document. The original document is moved relative to the reading means such that successive paths are scanned whereupon the output of the scanning element is fed to a device such as a photodetector which converts the variations in light intensity received by the scanning element due to variations in the reflectivity or transmissivity of the scanned copy to electrical signals. These electrical signal then convey information concerning the radiation absorption, emission or reflection of the scanned document. The electrical information-bearing signals are then transmitted to a receiving unit over suitable means such as a telephone network and the receiving unit converts the electrical information-bearing signals from the transmitting unit to marks or images on a receiving copy medium so that the received copy is a reasonable facsimile of the original scanned document.

In commercially available facsimile systems, rather complex lens-mirror optical systems are utilized in the scanning of a document. These lens-mirror optical systems which are capable of achieving the necessary level of resolution, are extremely expensive and constitute a considerable portion of the overall cost of a rather expensive transceiver.

The use of fiber optics in the optical scanning system of facsimile transceivers has also been suggested. In U.S. Pat. No. 3,553,366 — Brouwer, a flexible fiber optic is utilized for optically scanning a document in combination with a lens which separates the document being scanned from the reading fiber optic.

In U.S. Pat. No. 3,588,514 — Simpkins, a reading fiber optic which is surrounded by a plurality of illuminating fiber optics is located in the recess of a block which rides on the surface of the document being scanned and thereby places the reading fiber optic in direct optical communication with the document. A tube encloses the reading fiber optic as well as the illuminating fiber optics which surround the reading fiber optic to prevent wear and the accumulation of foreign matter and debris on the end of the tube. Although the depth of the recess is indicated as 0.0005 to 0.001 inches and the tube enclosing the fiber optics is indicated as flush with the base of the recess, there is no indication as to the spacing between the end of the reading fiber optic and the document which will have a critical effect on the resolution which can be achieved. There is also no indication as to the relationship between the diameter of the reading fiber optic and this spacing.

U.S. Pat. Nos. 3,201,512 — Mason et al and 3,448,207 — Green et al also disclose or suggest the use of fiber optics in a facsimile system. Neither patent discloses or discusses the nature of the spacing between the ends of the fiber optics and the document being scanned.

In addition to failing to teach the nature of the critical spacing which must be maintained to optimize the resolution of a facsimile system and properly illuminate the area being scanned, the prior art also fails to disclose a means by which the end of the fiber optic may be maintained clear of debris. Although the Simpkins patent does disclose the use of a recess which is provided, ostensibly for this purpose, it has been found that a recess alone can actually compound the problems of maintaining the end of a fiber optic free of debris. Since the recess itself serves to collect debris, the debris will cover the end of the reading fiber optic as well as the illuminating fiber optics if the ends of those fiber optics are flush with or below the base of the recess.

The prior art also fails to disclose a means by which the spacing between the end of the fiber optic and the document being scanned can be maintained without undesirable fluctuations when a discontinuity in the document thickness passes the fiber optic. In the case of the Simpkins patent, the block containing the fiber optic rides on the document being scanned. As a result, any discontinuity in the document thickness will create a bouncing between the block and the document which will in turn affect the spacing of the document from the end of the reading fiber optic.

SUMMARY OF THE INVENTION

It is an object of this invention to provide a low-cost facsimile apparatus.

It is a more specific object of this invention to provide a facsimile apparatus with a low-cost optical scanning apparatus.

It is a still further specific object of this invention to provide a low-cost facsimile apparatus which utilizes at least one reading fiber optic in direct optical communication with a document being scanned while optimizing the resolution of the apparatus.

It is also an object of this invention to prevent debris and foreign material from collecting at the end of a fiber optic which is in direct communication with a document being scanned.

It is a further object of the invention to prevent fluctuations in the spacing between the end of the fiber optic in direct communication with a document being scanned when a discontinuity in the document thickness passes the fiber optic.

In accordance with these and other objects of the invention, a facsimile transceiver comprises a document carrying means, reading means for detecting the information content of a document carried by the document carrying means and scanning means for moving the reading means relative to the document carrying means. The reading means comprises at least one fiber optic extending into close proximity with the document carrying means such that the distance between a document on the document carrying means and the end of the fiber optic is 30% to 300% of the maximum cross-sectional dimension of the reading fiber optic.

In one embodiment of the invention, the reading fiber optic extends through a central opening in a light conducting medium comprising a light pipe which illuminates the area being read by the reading fiber optic. The light pipe extends beyond the end of the fiber optic adjacent the document carrying means with an interior surface tapering away from the fiber optic and an exterior surface tapering toward the fiber optic.

In another embodiment of the invention, a plurality of illuminating fiber optics substantially surround a centrally located reading fiber optic so as to illuminate the area of the document being read by the reading fiber optic. In a particularly preferred embodiment, the illuminating fiber optic has axes which are inclined with respect to the reading fiber optic. This allows adequate illumination of the information-bearing area on the document without sacrificing illumination.

In another embodiment of the invention, a plurality of reading fiber optics are utilized in conjunction with a plurality of illuminating fiber optics. The reading optics and the illuminating fiber optics may be randomly selected to achieve an interspersing of the reading fiber optics with illuminating fiber optics and thereby assure proper illumination. As an alternative, the reading fiber optics may be selected so as to provide a centrally located aperture substantially surrounded by illuminating fiber optics.

In accordance with another important aspect of the invention, the document carrying means comprises a document/copy drum which is mounted for rotational motion about the axis of the drum. The reading means comprises a combination read/write head for scanning along the surface of the drum in a direction parallel with the drum axis when the apparatus is utilized to transmit and a reading fiber optic in direct optical communication with a document carried by the drum is carried by the read/write head along with the writing means for marking on the copy medium when the apparatus is utilized to receive.

In accordance with still another aspect of the invention, the facsimile apparatus comprises a document carrying drum, means for mounting the drum for rotational motion about the drum axis and a reading head biased into contact with a document carried by the drum where the head has a curved surface generally conforming with the surface of the drum so as to make contact with the surface of the drum in the vicinity of an optical scanning means and being arcuately spaced from the drum at locations more remote from the optical scanning means so as to prevent bouncing of the head when a discontinuity in document thickness passes between the head and the document being scanned. In a preferred embodiment, the curved surface has a radius of curvature substantially equal to the drum in the vicinity of the optical scanning means and a larger radius of curvature more remote from the optical scanning means so as to increase the spacing between the curved surface of the head and the document carried by the drum smoothly with increasing distance from the optical scanning means. As the discontinuity in the document reaches the curved surface remote from the optical scanning means, the discontinuity slides through a decreasing space between the portion having a greater radius of curvature and the document thereby permitting the discontinuity to gradually, with an upward force less than the force maintaining the head in contact with the drum, move the optical scanning means toward or away from the center of the document-carrying drum thereby avoid bouncing of the head.

In accordance with another aspect of the invention, the optical scanning means comprising a fiber optic is located in a recess with the reading fiber optic protruding into the recess beyond the base thereof so as to prevent the accumulation of dirt on the end of the fiber optic while still maintaining the spacing of the fiber optic with respect to the document carried by the drum.

In accordance with a further aspect of the invention, the optical scanning means comprising a fiber optic scanning means is surrounded by a surface generally conforming with the surface of a document carried by a drum so as to seal the fiber optics off from debris which might be carried by the document. In a particularly preferred embodiment of the invention, the surface surrounding the fiber optic scanning means comprises a wear-resistant material and the fiber optics are recessed with respect to the surface of the wear-resistant material.

BRIEF DESCRIPTION OF THE DRAWINGS

FIG. 1 is a top-plan view of a facsimile transceiver constructed in accordance with the invention;

FIG. 2 is a side view of the transceiver shown in FIG. 1;

FIG. 5 is a sectional view of the scanning head taken along section line 5—5 of FIG. 3;

FIG. 6 is an end view of the scanning head taken along line 6—6 of FIG. 3;

FIG. 7 is an end view of the scanning head taken along line 7—7 of FIG. 3;

FIG. 8 is a view of the scanning head drive mechanism taken along line 8—8 of FIG. 5;

FIG. 13 is a sectional view at the end of still another fiber optic scanning means which may be utilized in the head of FIGS. 1–8;

FIG. 14 is a sectional view of the head and the rotating drum in the facsimile apparatus of FIGS. 1–8 wherein the fiber optic scanning means of FIG. 9 is utilized;

FIG. 15 is a schematic view of the head and drum of FIG. 14 depicting the configuration of the head surface adjacent the drum;

DETAILED DESCRIPTION OF A PREFERRED EMBODIMENT

Figure 4:
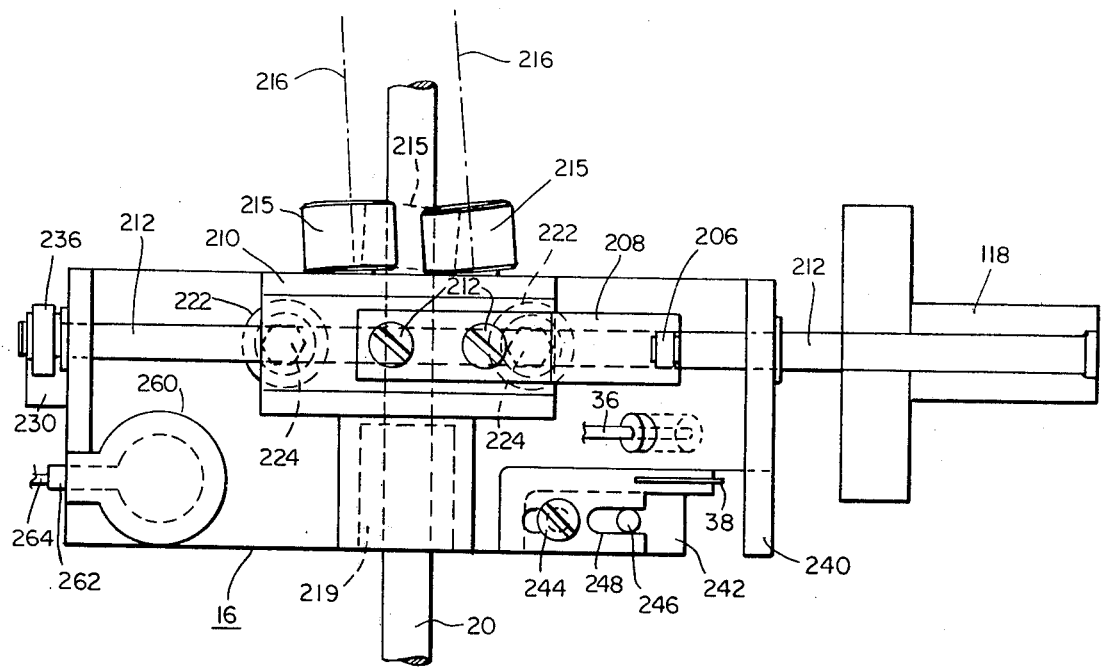
FIG. 4 is an enlarged top-plan view of the scanning head for the transceiver shown in FIG. 2.

Referring to FIGS. 1 and 2, a facsimile transceiver comprises a synchronous motor 10 which drives a document/copy receiving drum 12 rotatably about a drum shaft 14 which extends along a drum axis while also driving a scanning head 16 along a substantially linear path parallel to the drum axis. The head is advanced along the linear path by the cooperation between a head drive mechanism 18 and a shaft 20 which is located rearwardly and parallel to the drum shaft and is also driven by the motor 10 via a belt 22 which couples the shaft 20 to the shaft 14. Pulleys 24 and 26 secured to the shafts 14 and 20 respectively are provided for the belt 20 while a flexible coupling 28 connects the motor drive shaft of the motor 10 to the shaft 20. The motor 10, the drum 12 and the head 16 are supported for rotation on a molded U-shaped frame 30 wherein the head shaft 20 and the drum shaft 22 are journaled in bearings 32 and 34 respectively.

In accordance with an important aspect of this invention, the head 16 shown in FIGS. 1 and 2 is a read/write head giving the transceiver the capability of transmitting information scanned by the head on an original document applied to the drum 12 while also having the capability of receiving and then writing on a copy medium applied to the drum 12 as the head 16 scans in a direction parallel with the axis of the rotating drum 12. More particularly, the head 16 comprises an optical scanner including a bundle of fiber optics 36 which extend through an opening into close proximity and direct optical communication with the surface of the drum 12. The fiber optics serve to detect light-dark variations in the original document applied to the drum when the transceiver is operating in the transmitting mode. The head 16 also includes a stylus 38 which extends into contact with an electrosensitive copy medium carried by the drum so as to mark the copy medium in accordance with a received information-bearing signal applied to the transceiver when operating in the receiving mode.

In accordance with my invention shown and described in copending application Ser. No. 333,616 filed Feb. 20, 1973 the copy medium applied to the drum 12 forms a closed or endless loop circumscribing the drum so as to eliminate the necessity for synchronizing the initial relative/angular position of the original document on a transmitting transceiver drum with respect to the scanning head 16 and the initial relative/angular position of the copy medium on a receiving transceiver drum 12 with respect to the scanning head 16. In this connection, the drum 12 includes an axially extending slot 40 which extends along the entire length of the drum 12 at the periphery thereof. The slot 40 has a clamping mechanism associated therewith for the copy medium which may be opened and closed by a finger engagable member 42.

Figure 3:
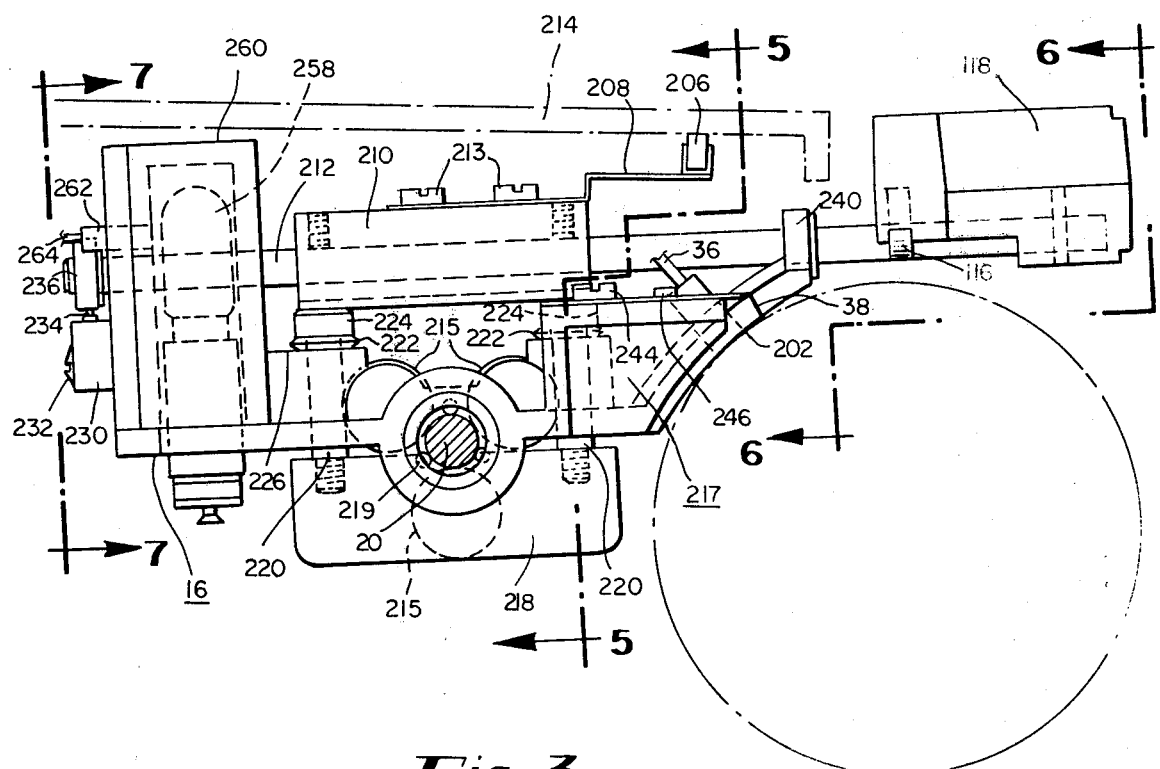
FIG. 3 is an enlarged side view of the scanning head for the transceiver shown in FIG. 2 taken along line 3—3.

In accordance with an important aspect of my invention, which forms the subject matter of the aforesaid copending application Ser. No. 333,616, a cutting roller 64 is rotatably carried by the head 16. As best shown in FIG. 6, the head includes the cutting roller 64 as well as an opposite relatively soft roller 116. In the receiving or transmitting mode, the head 16 will advance in a direction generally parallel with the axis of the drum 12 with neither the cutting roller 64 nor the soft roller 116 in contact with the copy medium or original document carried by the drum. By manually twisting a head knob 118 which projects forward from the head 16, the cutting roller 64 or the roller 116 may be brought into contact with the copy medium. By twisting in a clockwise direction, the roller 64 is brought into contact with the copy medium to allow the roller 64 to engage and sever the copy medium as the head 16 is moved manually or automatically along a line parallel with the axis of and generally above the drum 12. Prior to severing the copy medium, the drum must rotate to a position so that the cutting roller 64 will engage the copy medium along a line which will establish an appropriate margin for the information content on the copy medium. If the knob 118 is rotated in a counterclockwise direction, the roller 116 will be brought into contact with the copy medium. As shown in FIG. 3, the roller 116 is rather broad so as to ride easily along the surface of the copy medium on the drum 12.

To permit the cutting roller 64 to advance freely across and thereby sever the copy medium, it is first necessary to disengage the head drive. This is accomplished by means of a novel head drive mechanism which is the invention of Luther R. Winters, Jr. and the subject matter of the aforesaid copending application Ser. No. 332,927. This drive mechanism and other novel aspects of the head described in the aforesaid copending application will now be discussed in detail.

In accordance with the invention of the aforesaid application Ser. No. 332,927, the head 16 is driven by and mounted on the single drive shaft 20 as shown in FIGS. 3–5. The head is then rotatably biased to a position of engagement between arcuate surface 202 of the head member which also carries a bundle of fiber optics 36. Since the arcuate surface 202 is maintained in contact with the document carried by drum 12 and the spacing between that surface 202 and the document is fixed, the distance between the ends of the fiber optics 36 and the surface 202 is thereby fixed. The critical distance between the end of the fiber optics and the document being scanned is thereby maintained so as to optimize the scanning of the document in accordance with this invention.

In order to rotatably bias the arcuate surface 202 into contact with the document carried on the drum 12, a roller 206 is carried by a resilient arm 208 which is attached to a cam member 210 coupled to a head control shaft 212 which extends generally perpendicularly to the axis of the drum 12 and the drive shaft 20. The resilience of the arm 208 which is attached to the cam 210 by threaded fasteners 213 rides along the interior surface of an upper transceiver casing member 214 shown in broken lines. The casing member 214 pushes against the roller 204 tending to rotate the head 16 so as to force the surface 202 against the document carried by the drum 12 thereby assuring the proper spacing between the fiber optics 204 and the document.

The drive mechanism of the head 16 which advances the head as the shaft 20 rotates comprises a plurality of skewed rollers or cam followers 215 which engage the shaft 20 at different angular positions. By skewing the axis 216 of each of the rollers 215 with respect to the shaft 20 as best shown in FIG. 4, rotation of the smooth shaft 20 will result in rotation of the smooth rollers 215 which in turn advances the head 16 along the shaft 20. In order to provide for this advancement, each of the axes 216 is skewed a very small angle in a plane parallel to the plane of tangency between the roller 214 and the shaft 20. In order to optimize the resolution of the facsimile system, the head 16 must be advanced in small increments and this calls for a very small angle of skewing, preferably less than one degree. In this manner, a single shaft 20 is able to drive as well as support the head 16 without the use of threads on an additional drive shaft. Bearings 219 are also provided in the head 16 at the end opposite the rollers 215 to support the head on the shaft 20.

In order to permit the head 16 to be more freely advanced axially along the drum 12 independently of the head drive, the rollers 214 are mounted so as to permit the rollers 214 to disengage the shaft 20. In this connection, two of the rollers 214 are mounted on a head member 217 which forms the upper and principal portion of the head 16, and a third roller 215 is mounted on a relatively movable head member 218 which forms the lower portion of the head. Threaded fasteners 220 extend through holes in the upper head member 217 and engage the lower head member 218. In order to bias the rollers 214 into contact with the shaft 20, compressible rings 222 are provided between the head 224 of the fasteners 220 and adjacent surfaces of the upper head member 217. The rings 222 then serve to separate the heads 224 from the surface 226 thereby forcing the upper roller 215 toward the lower roller 215 which in turn results in engagement between the rollers 215 and the shaft 20.

In order to disengage the rollers from the shaft 20 and thereby more easily manually move the head assembly along the drum axis, the knob 118 is twisted in a clockwise or counterclockwise direction. This will rotate the shaft 212 to which the knob 118 is secured and this will in turn rotate a cam 210 secured to the control shaft 212 to a position of engagement with the tops of the heads 224 as shown in broken lines in FIG. 5. This in turn will compress the ring 222 as the threaded fastener 220 is forced downwardly thereby separating the upper rollers 215 from the lower rollers 215 to disengage the shaft 20. Once the rollers have been disengaged from the shaft 20, the head 16 may be more easily and freely moved along the shaft to permit the copy medium to be severed by the roller 64. In the alternative, the knob 118 may be twisted in a counterclockwise direction which also serves to disengage the rollers from the shaft 20 to allow the head 16 to be easily repositioned as the soft roller 116 shown in FIGS. 3 and 6 rolls axially along the drum. Twisting of the knob 118 may also release the bias on the head which forces the surface 202 toward the drum by rotating the roller 116 away from the surface 214 thereby allowing the head to slide more easily along the shaft 20 while avoiding contact between the stylus 38 and the copy medium which might otherwise result in the snagging or severing of the copy medium.

Another important aspect of the head 16 involves the use of the shaft 212 to open and close a switch which controls the application of power to the stylus 38. In this connection, FIGS. 3 and 7 show a micro-switch 230 secured to the rear of the head 16 by screws 232. The switch 230 includes an actuatable member 234 which projects into contact with a cam 236 attached to the end of the control shaft 212. Whenever the control shaft 212 is rotated by twisting the knob 118 corresponding to manual movement of the head 16, the actuatable projection 234 will be allowed to ride as cam surfaces 238 move into contact therewith and this interrupts the application of power to the stylus 38. Thus, when the head must be handled by an operator to adjust its position, the power to the stylus is interrupted so that any contact between the operator's fingers and the stylus would not be injurious to the operator. In addition, the stylus 38 is recessed behind a member 240 as best shown in FIGS. 3 and 4. As also shown in these figures, the stylus 38 is mounted on a shelf 242 of the upper head member 217. However, to hold the proper position for the stylus 38 on the shelf 242, a screw 244 extends down into the shelf and an integral projection 246 extends into a slot 248 of the stylus 38.

Referring now to FIG. 6, the surface 202 rides on the document carried by the drum 12 so as to maintain the appropriate spacing between the end 250 of the fiber optics 204 and the document carried by the drum 12. In accordance with another aspect of this invention, the ends 250 of the fiber optic 204 extend slightly beyond the base 252 of the recess 254 in the surface 202. This prevents the collection of dirt on the ends 250 of the fiber optics 36 since the dirt tends to collect around a fiber optic protective jacket 256 which surrounds the fiber optics 36 rather than on the ends 250 of the fiber optics themselves. Note that the fiber optic spacing from the document carried by the drum 12 is maintained since the recess 254 is deeper in the surface 202 than the overall protrusion of the ends 250 of the fiber optics from the base 252 of the recess 254.

In order to illuminate the area of the document being scanned, the bundle of fiber optics 204 include a plurality of fiber optics which are optically coupled to a light source 258 enclosed within a housing 260 located at the rear of the head 16. As shown in FIGS. 3 and 7, a jacket 262 extends through an opening 261 in the housing 260 which receives a bundle of illuminating fiber optics 264. At least one additional fiber optic extending into the recess 254 is provided for detecting the way in which the light from the illuminating fiber optics is absorbed, emitted or reflected from the document being scanned by the head 16. This reading fiber optic is then coupled to a suitable photo-detector such as a photodiode or photo-transistor. The illuminating fiber optics which extend between the light source 262 and the recess 254 have not been shown nor has the reading fiber optic which extends from the recess 254 to the photo-detector.

As shown in FIG. 7, the light source 258 comprises a bulb mounted in a socket 266 which is secured to the housing 260 by a fastener 268. The socket 266 includes terminals 270 which are connected to a suitable power source by leads 272.

Figure 9:
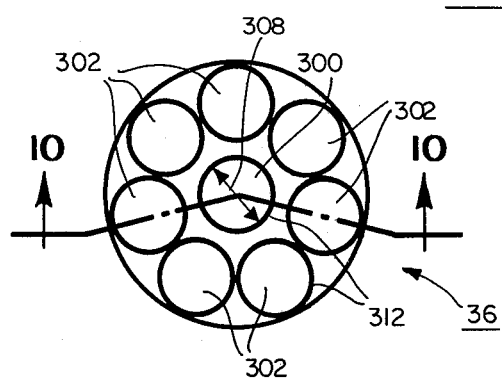
FIG. 9 is an end view of a fiber optic scanning means which may be utilized in the head shown in FIGS. 1–8.
Figure 10:
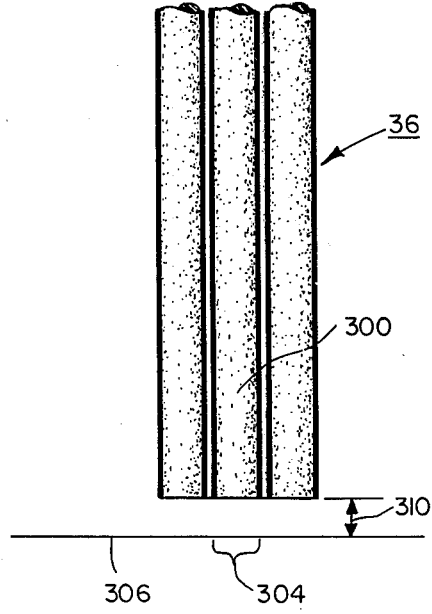
FIG. 10 is a sectional view of the fiber optic scanning means of FIG. 9 taken along section line 10—10.

FIGS. 9 and 10 depict a bundle of fiber optics 204 which protrude from the base of the recess 254 in the surface 202. As shown, a single reading fiber optic 300 is centrally located with respect to a plurality of illuminating fiber optics 302 which establish a solid light conducting medium substantially surrounding the reading fiber optic 300. By surrounding the reading fiber optic in this manner, the illuminating fiber optics are able to adequately illuminate the area 304 of a document 306 as shown in FIG. 10 through a non-solid light conducting region where the end of the reading fiber optic 300 is spaced from the document 306 a distance of from about 30% to 300% of the maximum cross-sectional dimension 308 of the reading fiber optic 300. Thus where the diameter of the reading fiber optic is .010 of an inch, the distance 310 between the end of the fiber optic 300 and the document 306 will lie between 0.003 and 0.030 of an inch, and preferably greater than .003 of an inch to assure proper illumination. The range of 100% to 150% or 0.010 to 0.015 inches has been found to be most satisfactory when the reading fiber is 0.010 inches in diameter. This spacing permits a very good resolution of the light-dark variations detected by reading fiber optic 300.

As utilized herein, the term fiber optics refers to fibers of a glass or plastic nature which, as shown in FIG. 9, may be clustered together to form a bundle. In principle, light entering one end of the fiber is transmitted to the other end by a process of internal reflection. To prevent leakage from a fiber, it may be insulated with a coating 312 of lower refractive index than that of the fiber itself. Bundled plastic fiber optics of this type may be purchased from duPont under the designation Crofon or suitable glass fibers may be purchased from the Corning Glass Works.

Figure 11:
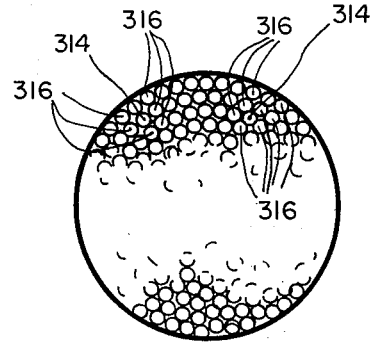
FIG. 11 is an end view of another fiber optic scanning means which may be utilized in the head of FIGS. 1–8.

In another embodiment of the invention shown in FIG. 11, a plurality of reading fiber optics 314 are interspersed with a plurality of illuminating fiber optics 316 such that each of the reading fiber optics 314 is adjacent or substantially surrounded by the illuminating fiber optics 316. In this embodiment, the ends of the fiber optics 314 and 316 are preferably spaced from the document being scanned a distance of 30–100% of the maximum cross-sectional dimension of the fiber optics 314. In this particular embodiment, it is desirable to utilize the fiber optics such as those produced by Corning Glass Works having a .001–.005 inch diameter.

Figure 20A:
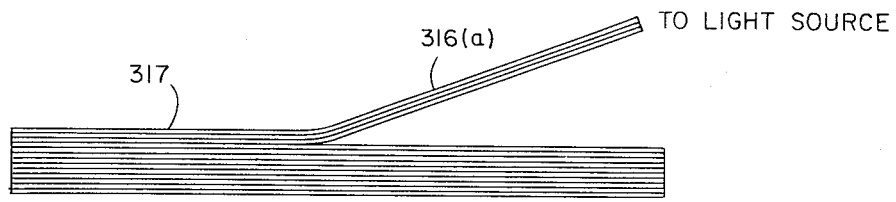
FIGS. 20 (a–c) depict a step-by-step method of selecting the fiber optics shown in FIG. 11.
Figure 20B:
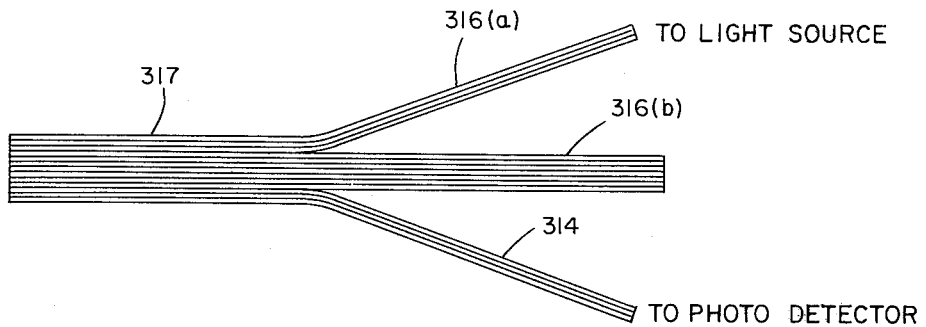
Figure 20C:
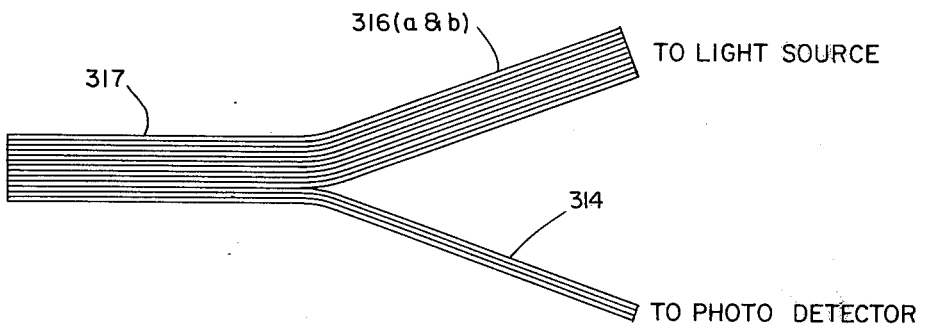

The selection of the reading fiber optics 314 and the illuminating fiber optics 316 may be made utilizing a statistical, random approach illustrated in FIGS. 20a and 20b. When starting with a bundle 317, a first set of illuminating fiber optics 316 are randomly selected for connection to the light source 258. Next, a set of reading fiber optics 314 are randomly selected from the remaining bundle for connection to the photodetector as shown in FIG. 20a. The remaining set of fibers 316(b) are then added to the set of fiber optics 316(a) for connection to the light source 258.

The number of reading fiber optics 314 and the number of illuminating fiber optics 315(a) and 316(b) depend upon the total number of fibers in the bundle 317 and a bundle of fibers 314 which also represent from 15–35% of the fibers in the bundle. The remaining fibers in the bundle 316(b) may represent from 70–30% of the fibers. In other words, where the total number of fibers in the bundle 317 is 30, the bundle 316(a) comprises 4–12 fibers as does the bundle 314. The bundle 316(b) will therefore comprise from 26–18 fibers. In a preferred embodiment, a total of 7 fibers are included in the bundle 316(a) and a total of 7 fibers are also included in the bundle 314. The remaining fibers, 15 in all, make up the bundle 316(b).

Figure 21:
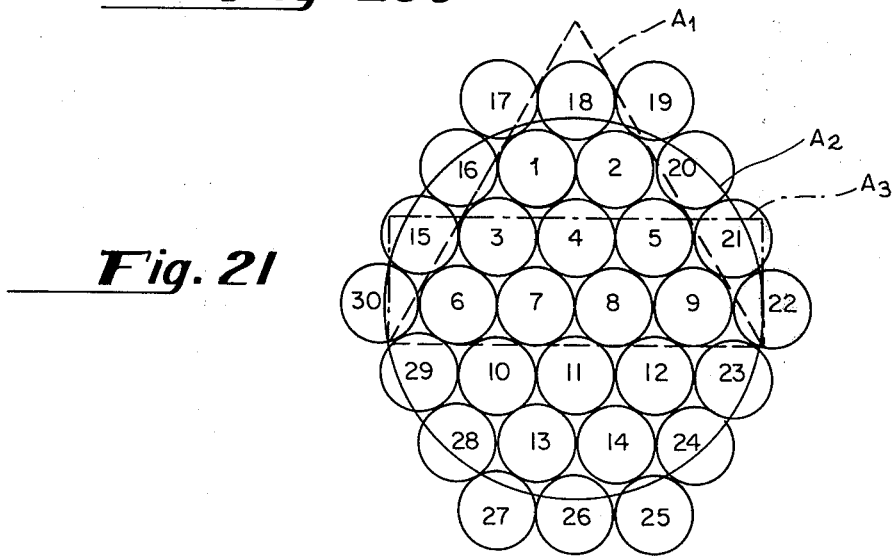
FIG. 21 schematically illustrates the selection of illuminating fiber optics to provide apertures of predetermined configurations.

In the embodiment described in the foregoing, the bundle of reading fibers 314 and the bundles of illuminating fibers 316(a) and 316(b) have been chosen at random. Reference will now be made to FIG. 21 wherein the illuminating fibers and the reading fibers of a bundle comprising a total of 30 fibers are chosen so as to provide a desired geometric shape for the reading fiber optics. In this connection, it has been found particularly desirable to choose the individual fibers (1–30) such that the reading fibers form triangular, circular or a rectangular aperture configurations $A_1$–$A_3$. In particular, fiber numbers 3, 5, 6, 8, 10, 11 and 12 may be connected to the photodetector forming the bundle 314 in a substantially circular aperture configuration while the remaining fibers are connected to the light source 258. A rectangular configuration may be achieved by connecting the fibers 3, 4, 5, 6, 7, 8 and 9 to the photodetector while connecting the remaining fibers to the light source 258. Finally, a triangular configuration may be achieved by connecting the fibers 6, 7, 8, 9, 3, 5, 1 and 2 to the photodetector. As shown in FIG. 21, the choice of aperture configuration $A_1$–$A_3$, with the specific fibers noted above leaves each reading fiber substantially surrounded by illuminating fibers.

Figure 22:
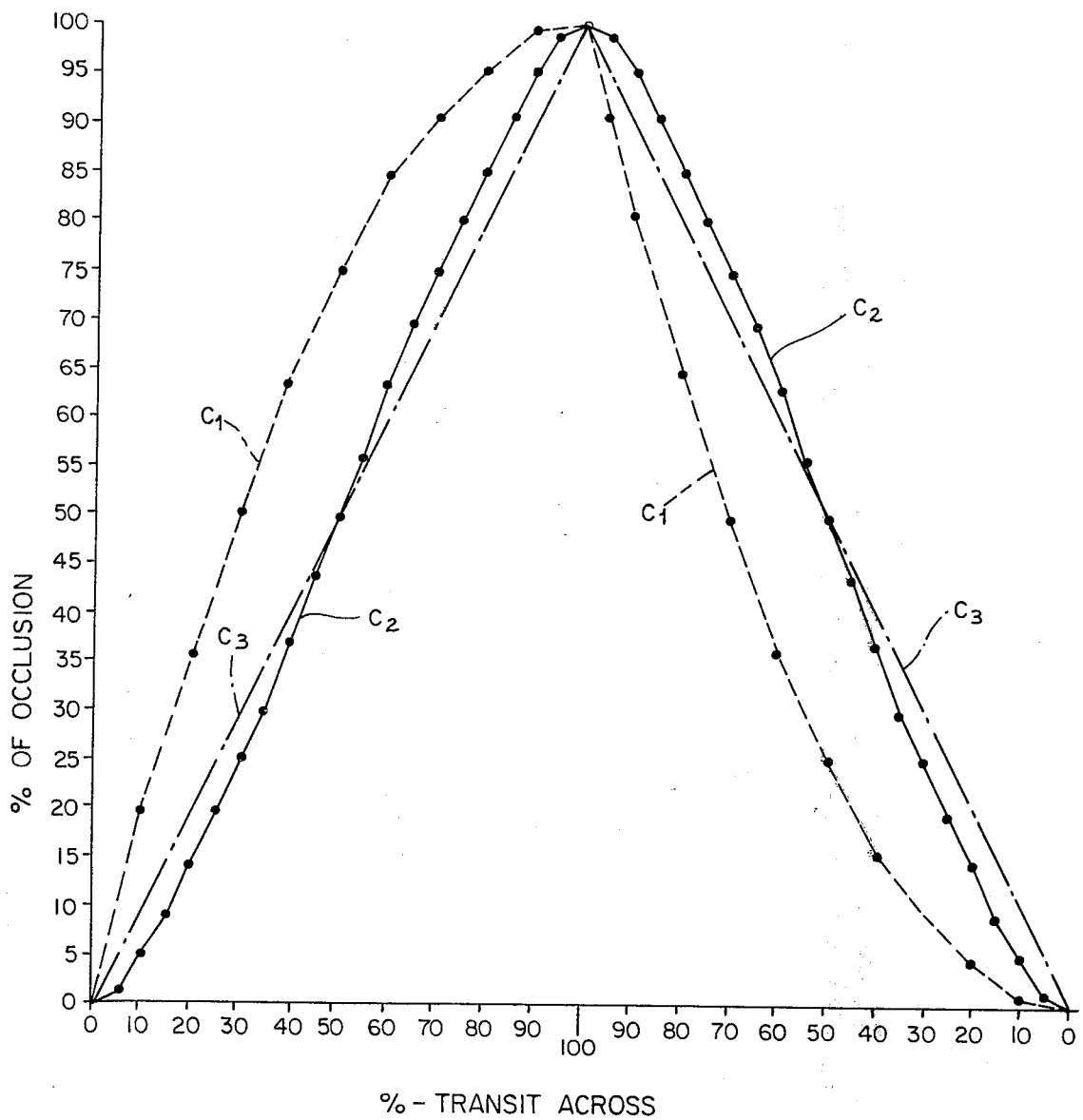
FIG. 22 depicts the scanning characteristics for the various aperture configurations shown in FIG. 21.

The effect of the various configurations or apertures shown in FIG. 21 on the reading of information carried by a document may be observed with reference to FIG. 22. As shown there, the ordinate represents the percentage of a dark, information-bearing mark under the aperture represented by the reading fiber optics 314 while the ordinate represents the percentage of transit across the darkened, information-bearing area on the document. In other words, the 100% mark on the abscissa represents substantial alignment of the center of the reading fiber aperture with the center of the information-bearing area. It will therefore be seen that the percentage of the aperture whether circular, rectangular or triangular which is occluded at the mid-transit point is 100%. In the case of a triangular aperture as depicted by the curve $C_1$, the percentage of the aperture occluded by the darkened, information-bearing area is occluded rapidly with respect to the transit distance until the 100% transit mark is reached. Then, the percentage of occlusion decreases rapidly. In the case of a circular aperture, the rate of increase in occlusion for the curve $C_2$ is somewhat slower as the transit distance increases from 0 – 100%. Note that the curve $C_2$ is symmetric with respect to the vertical line intersecting the 100% transit point. Finally, the rate of increase in occlusion is a constant in the case of the rectangular aperture as depicted by curve $C_3$. The curve $C_1$ corresponds to a triangular aperture having a base and height of 0.010 inches while the curve $C_2$ corresponds to a circular aperture having a diameter of 0.010 inches. The curve $C_3$ corresponds with a rectangular aperture having a length and width of 0.010 inches.

It will be noted that the length of transit time during which the aperture is at least 50% occluded is the same for all aperture shapes. However, the rate at which occlusion occurs varies. The triangular aperture represented by the curve $C_1$ is occluded much more rapidly than either the rectangulr aperture or the circular aperture.

Figure 12:
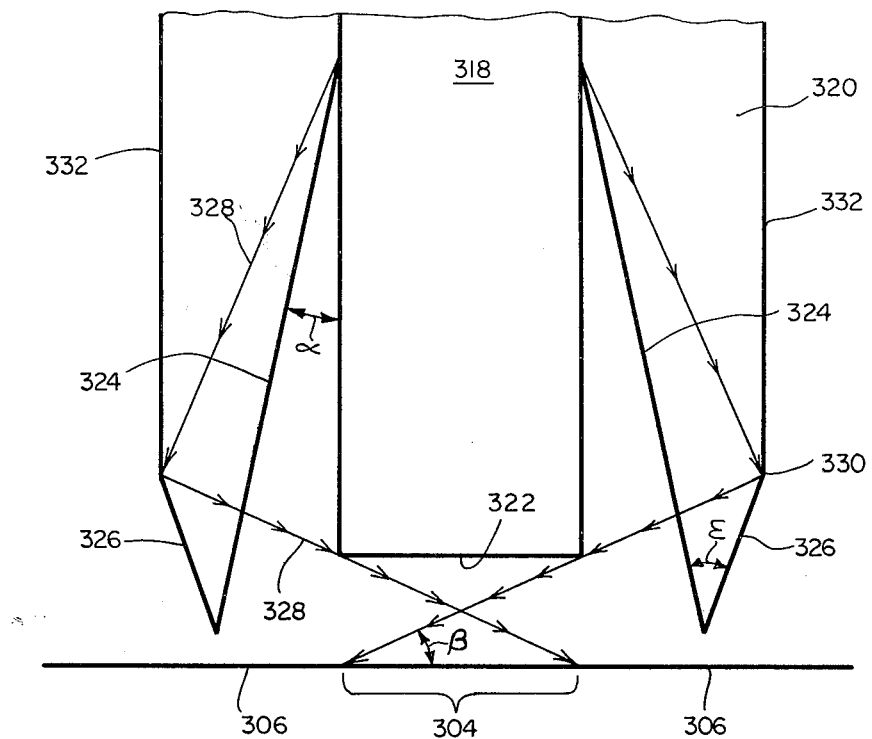
FIG. 12 is a sectional view at the end of still another fiber optic scanning means which may be utilized in the head of FIGS. 1–8.

Another embodiment of the invention is shown in FIG. 12 wherein a reading fiber optic 318 passes through a central opening in a light pipe 320. Thus the light conducting medium is a single integral member. In order to minimize the specularly reflected light which passes from the light pipe 320, to the document 306 and into the end 322 of the reading fiber optic 318, tapered surfaces 324 and 326 are provided on the end of the light pipe 320. In other words, the interior surface of the light pipe forms a frustroconical surface tapering away from the fiber optic 318 and the exterior surface 326 of the light pipe 320 forms a frustroconical surface tapering toward the fiber optic 318. Note that the light pipe 320 extends beyond the end of the fiber optic 318. As arrows 328 indicate, light rays striking the corner 330 between the surface 326 and the upper substantially cylindrical surface 332 of the light pipe 320 are reflected to the remote edge of the area 304 juxtaposed to the end 322 of the fiber optic 318 so as to prevent specularly reflected light from entering the end 322.

Where a Crofon (plastic) fiber optic 318 has a 0.010 inch diameter and the space between the document 306 and the end 322 of the fiber optic 318 is .005 inch, the angle $\beta$ must be less than 25° to prevent the specularly reflected light from entering the end 322 of the fiber optic 318 where $\beta$ is the angle between the document 306 and a ray 328 reflected from the point 330. To assure total reflection of the ray at the light guide surfaces, the angle $\alpha$ between the tapered surface 324 and a line parallel with the axis of the fiber optic 318 must be less than 45°. In a case where $\beta$ equals 25°, $\alpha$ must be less than or equal to 12.5° making $\epsilon$, the angle between the tapered surface 324 and the tapered surface 326 equal to 32.5°.

In the embodiment of FIG. 13, a reading fiber optic 334 is surrounded by a plurality of fiber optics (only two of which are shown) 336 where the axis of the illuminating fiber optics 336 are inclined with respect to the axis of the reading fiber optics 334 so as to prevent specularly reflected light from entering the end 338 of the reading fiber optic 334. In order to prevent total reflection of light from the end 340 of the fiber optics 336, the ends 340 are cut at an angle with respect to the axis of the fiber optics 336.

In accordance with another important aspect of the invention, the reading fiber optic protrudes from the base of the recess 254 in the surface 202. As shown in FIG. 14, the bundle of fiber optics 36 shown in FIGS. 9 and 10 protrude from the base 252 of the recess 254. In order to protect the bundle 36, the ends of the fibers 300 and 302 are flush with the end of the jacket 256 which itself protrudes beyond the base 252 into the recess 254. By providing this protrusion of the fiber optics into the recess 254, foreign matter in the form of dirt and dust will collect along the edges 344 of the jacket 256 and not at the ends of the fibers 204. Yet, the critical spacing between the end of the fiber optic 300 is maintained by providing the recess 254 with the appropriate depth.

As also shown in FIG. 14, the reading fiber optic 300 is coupled to a photodetecting semiconductor or other type of photodetector 346. The illuminating fiber optics 302 which are not shown are of course coupled to the source of light 258 shown in FIG. 7. In order to hold the bundle of fiber optics 204 in place within the jacket 256, a suitable cement 348 may be utilized or a jacket restraint such as heat-shrink tubing may be used for the jacket.

As further shown in FIG. 14, the drum head 16 includes a hard metal insert 257 such as steel which bears on the drum 12. The insert 257 forms a portion of the surface 202 which is more wear resistant than the portion of the surface 202 surrounding the insert 257.

In accordance with another important aspect of the invention, the curved surface 202 is contoured so as to permit the head 16 to ride on the document and the drum without substantial bouncing of the head which could interfere with the critical spacing between the end of the reading fiber optic and the surface of the document. As shown in FIG. 15, the contoured surface 202 of the head 16 which generally conforms with the surface of the drum 12 actually has different radii of curvature depending upon the location with respect to the optical scanning means in the form of the bundle of fiber optics 36. A first portion 350 of the surface 202 adjacent the bundle of fiber optics 36 and coextensive with the insert 257 shown in FIG. 14 has a radius of curvature $r_1$ which is substantially equal to the radius of curvature of the drum 12. A second portion 352 of the surface 202 has a radius of curvature $r_{2a}$ which is substantially larger than the radius of curvature $r_1$ of the drum 12. This permits the space between the surface 202 at the portion 352 and the drum 12 to increase with increasing distance from the bundle 36. Similarly, the portion 354 which is also spaced from the bundle of fiber optics 36 has a radius of curvature $r_{2b}$ to provide a drum-head spacing which increases with increasing distance from the fiber optics 36. By providing the larger radii $r_{2a}$ and $r_{2b}$ of curvature for the portions 352 and 354 with tangency of the arcs at the junctions of the portions 350, 352 and 354, a discontinuity 356 in a document 358 applied to drum 12 will permit the head 16 to be moved gradually away from the drum center 12 as the discontinuity 356 passes between the bundle of fiber optics 36 and the drum 12, and this prevents the bouncing of the head 16. Thus the discontinuity 356 as it first enters the portion 352 will force the head 16 away from the drum gradually until the discontinuity 356 reaches portion 350 which represents the surface of contact with the drum 12. The head 16 will then ride on the discontinuity 356 until the discontinuity 356 reaches the portion 354 at which time the head 16 will move gradually toward the drum 12 as the discontinuity 356 advances through the portion 354. It has been found that angles $r$ and $s$ corresponding to the portions 352 and 354 must be larger for larger discontinuities in the thickness of the document. The purpose of the increasing opening or space between the head and the drum surface over the range of these arc angles is therefore to insure that the force tending to raise the head from the drum surface, as it is accelerated away from the drum by a discontinuity on the drum surface, is less than the forces which tend to maintain the head in contact with the drum which may be furnished by components due to: the weight of the head, the rotational movement of the head about the shaft 20 due to shaft rotation, and the force provided by the roller 216 in spring contact with the transceiver housing. For example, where the discontinuity has a thickness of 0.01 inches, the angles r and s preferably equal 8° or more. Where the thickness of the discontinuity is 0.1 inches the angles r and s preferably exceed 20°. Preferably, angle $t$ corresponding to the portion 350 ranges from 10° to 20°.

Figure 16:
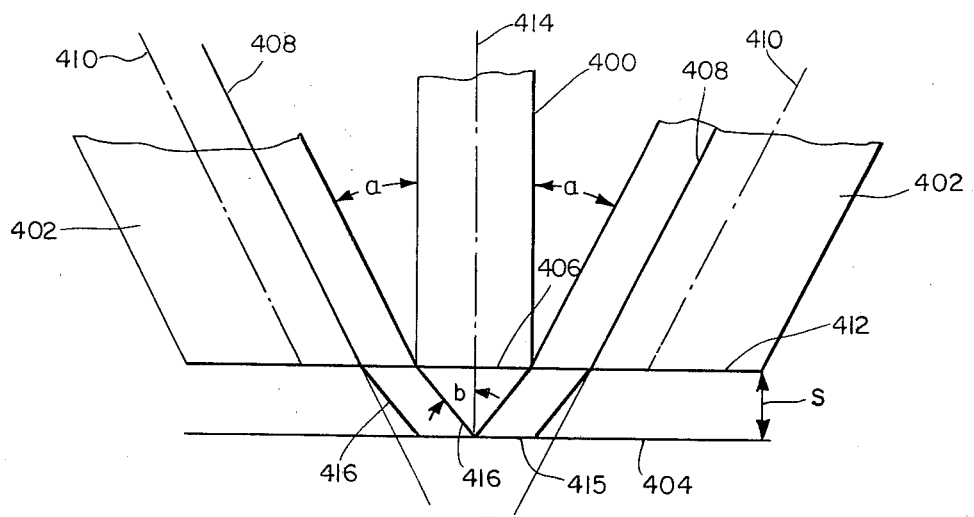
FIG. 16 is a sectional view of the end of another fiber optic scanning means which may be utilized in the head of FIGS. 1–8.
Figure 18:
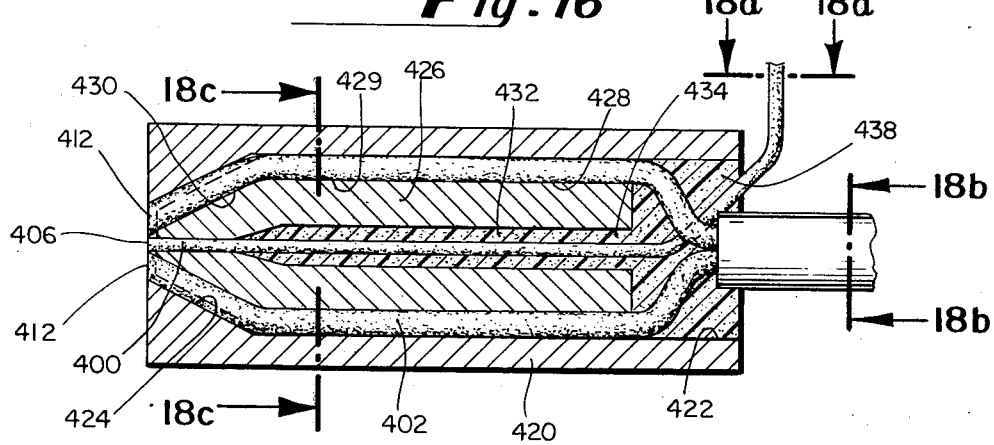
FIG. 18 is a sectional view of the assembly of FIG. 17.
Figure 17:
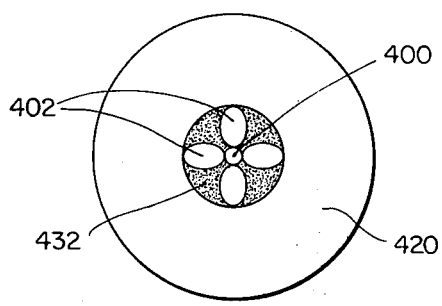
FIG. 17 is an end view of an assembly embodying the scanning means of FIG. 16.

In the embodiment of FIGS. 16–18 as in the embodiment of FIG. 13, a reading fiber optic 400 is surrounded by a plurality of (e.g., 4) fiber optics 402 which are inclined with respect to the axis of the reading fiber optic 400 so as to assure adequate illumination of the information on a document 404 while minimizing the spacing S between the terminal plane 406 of the reading fiber optics 400 from the surface of the document 404 so as to maximize the resolution of the reading fiber optic 400.

As shown in FIG. 16, light rays 408 which are parallel to the axes 410 of the illuminating fiber optics 402 are refracted at the terminal plane 412 of the fiber optics 402 toward the information-bearing area juxtaposed to the terminal plane 406 of the reading fiber optic 400. Because of the angle a between the rays 408 and the fiber optics 402 and the axis of the reading fiber optics 400 which is increased to an angle b for refracted rays 416, the information-bearing area juxtaposed to the terminal plane of the reading fiber optic 400 is well illuminated even though the spacing S between the reading fiber optic 400 and the document 404 is rather small. This illumination of the information-bearing area is supplemented by the spreading of rays which is attributable to those rays which do not travel parallel to the axes 410 of the illuminating fiber optics. In the embodiment of FIG. 16, it has been found that the spacing distance S between the terminal plane 406 of the reading fiber optic 400 and the terminal plane 412 of the illuminating fiber optics 402 may be less than the diameter of the reading fiber optic 400. For example, a spacing distance S of .006 inches may be utilized where the diameter of the reading fiber optic 400 is .010 inches while still assuring adequate illumination of the information on the document 404. In general, the space S may represent 30–100% of the reading fiber optic diameter. The value of the angle $a$ between the axis 410 and the axis 414 may be more than 0° and less than 44° with a range of 20°–35° targeted on 28° being preferred. This will result in an angle $b$ of more than 0° and less than 79° with a range of 36°–63° targeted on 45° being preferred assuming an index of refraction of 1.5 for the fiber optics and a nominal spreading of the rays of approximately 10° where spreading is attributable to those rays which do not travel parallel to the axes of the illuminating fiber optics and is not attributable to refraction.

In the preferred embodiment illustrated in FIG. 16, the diameter of the illuminating fiber optics 402 is twice the diameter of the reading fiber optics 400. In this connection, it has been found desirable to utilize a reading fiber optic of .010 inches in diameter and illuminating fiber optics of .020 inches in diameter. Of course, it is possible to utilize reading fiber optics and illuminating fiber optics of the same diameter, e.g., .010 inches each.

FIGS. 17, 18 and 18(a–c) disclose an assembly embodying the fiber optic configuration of FIG. 16. As shown there, the assembly comprises an outer jacket or holder 420 having a cylindrical inner wall 422 at the end remote from the document and a radially inwardly tapering inner wall 424 adjacent the document. An inner holder 426 is provided with longitudinally extending grooves 428 in an outer cylindrical surface 429 and a radially inwardly tapering surface 430 so as to trap the illuminating fiber optics 402 between the inner holder 426 and the outer holder 420 with the radially inwardly tapering walls 424 and 430 maintaining the appropriate angular relationship between the axes of the illuminating fiber optics 402 and the axis of the reading fiber optics 414 which extends through an axial opening 434 in the inner housing 426. A portion of the opening 434 is enlarged so as to receive a suitable adhesive filler such as an epoxy resin 438. The epoxy resin also fills the end of the housing 420 to cement the reading fiber optic 400 and the illuminating fiber optics 402 in place.

Figure 18C:
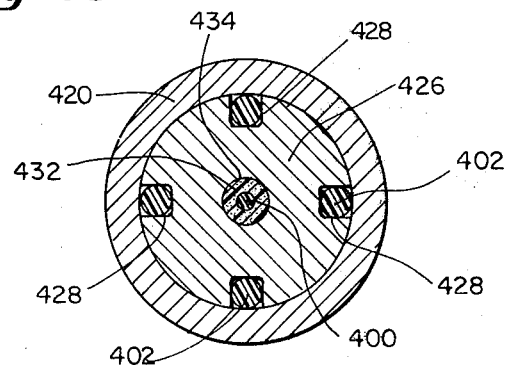
FIG. 18c is a sectional view of the assembly of FIG. 18 taken along line 18c—18c.
Figure 18A:
FIG. 18a is a sectional view of the reading fiber optic taken along line 18a—18a in FIG. 18.
Figure 18B:
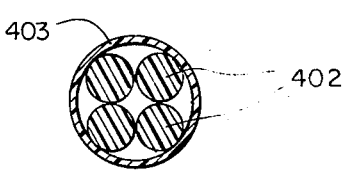
FIG. 18b is a sectional view of a bundle of illuminating fiber optics taken along line 18b—18b in FIG. 18.

Note from FIG. 17 that the reading fiber optic 400 and the illuminating fiber optics 402 are tangent to one another at the coplanar terminal planes 421 and 406. This assures the maximum illumination of the information-bearing area juxtaposed to the reading fiber optic 400. Since the terminal plane 412 of the reading fiber optics 402 are not perpendicular to the axes 410, the fiber optics 400 and 402 take on a "daisy-like" or elliptical configuration as shown in FIG. 17 with epoxy 432 filling the voids between the "petals" of the "daisy". The fiber optic 400 is clad in a shield 401 and the fiber optic 402 is clad in a shield 403 as shown in FIGS. 18a and 18b respectively.

Figure 19:
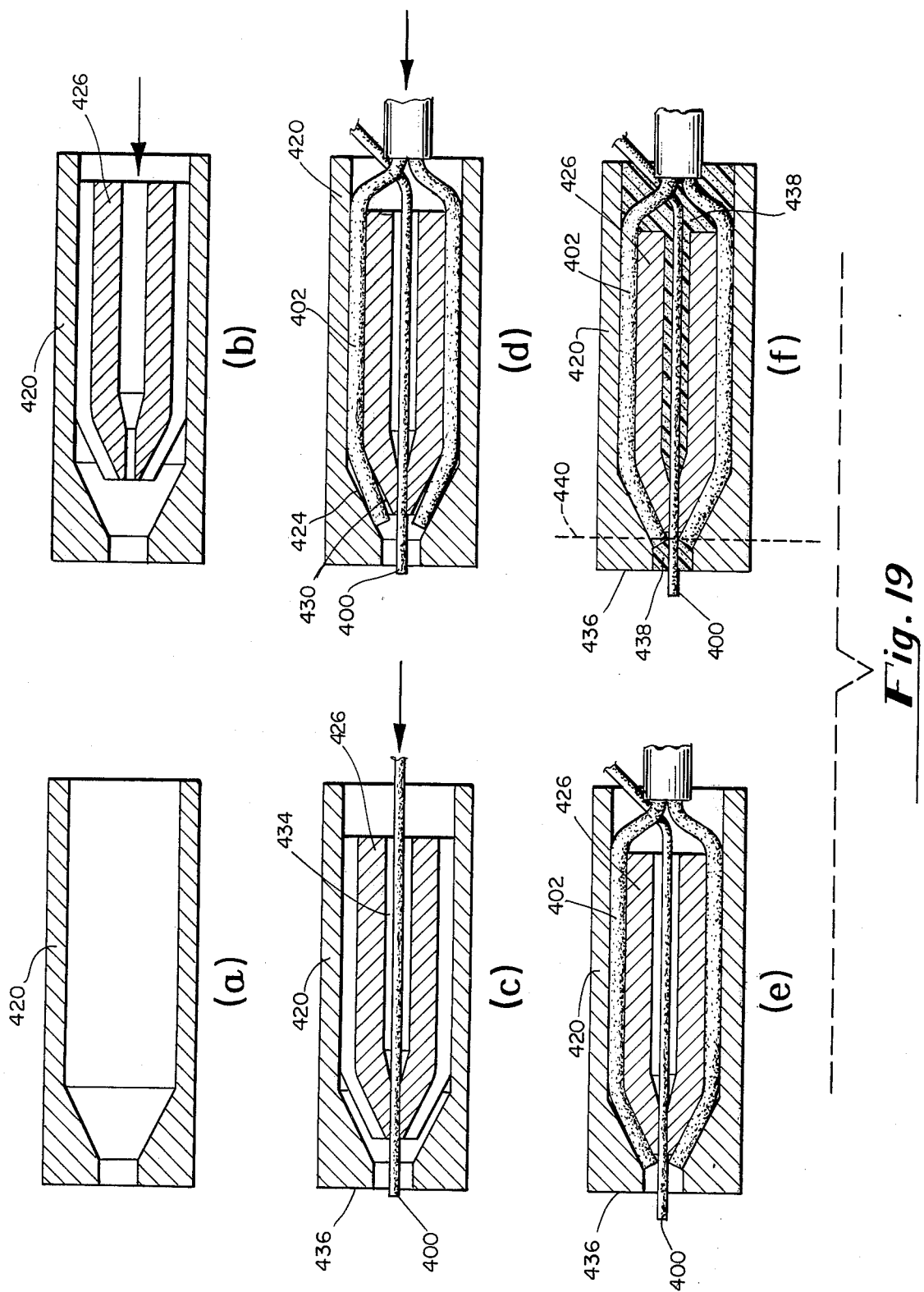
FIGS. 19 (a–f) depict the steps of a method for assembling the scanning means of FIGS. 17 and 18.

It should be appreciated that the relative positioning of the reading fiber optic 400 and the illuminating fiber optics 402 is very important to assure maximum resolution without sacrificing illumination. It has been found that the fiber optic holder assembly shown in FIG. 18 achieves the accurate positioning of the fibers with relative ease in assembly as will now be described with reference to FIGS. 19(a–f).

The assembly operation begins with an empty holder 420 shown in FIG. 19a. The inner holder 426 is then inserted into the outer holder 420 as depicted by the arrow in FIG. 19b. Once the inner holder 426 is loosely in place within the outer holder 420, the central reading fiber 400 may be inserted through the central opening 434 in the inner holder 426 until it extends from the extremity 434. The illuminating fiber optics 402 are now inserted between the inner holder 426 and the outer holder 420 until the tips of the fibers 402 extend beyond the end of the inner holder 426 as shown in FIG. 19d. Note that the radially inwardly tapering surfaces 424 and 430 of the outer holder 420 and the inner holder 426 respectively guide the illuminating fiber optics 402 toward the illuminating reading fiber optic 400.

The inner holder 426 may be pushed or jammed forward toward the extremity 434 of the outer holder 420 so as to bring the illuminating fibers 402 into tangential contact with the fiber 400 and lock the fibers in place. This is followed by filling the voids between the fibers 402 within the central opening of the outer holder 420 and the void within the central opening of the inner holder 426 with a suitable cement such as the epoxy resin 438. After the epoxy resin 438 dries, the extremity 436 of the outer holder 420, the protruding reading fiber 400 and portions of the illuminating fibers 402 may be cut off at a line 440 with subsequent grinding and polishing to achieve the assembly shown in FIG. 18.

Figure 23:
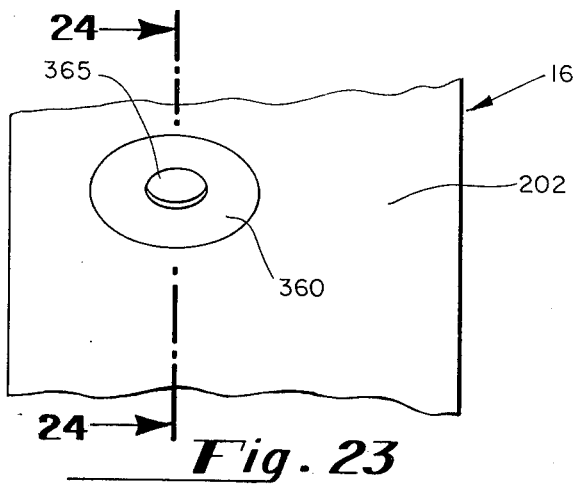
FIG. 23 is an elevational view of a modified head.
Figure 24:
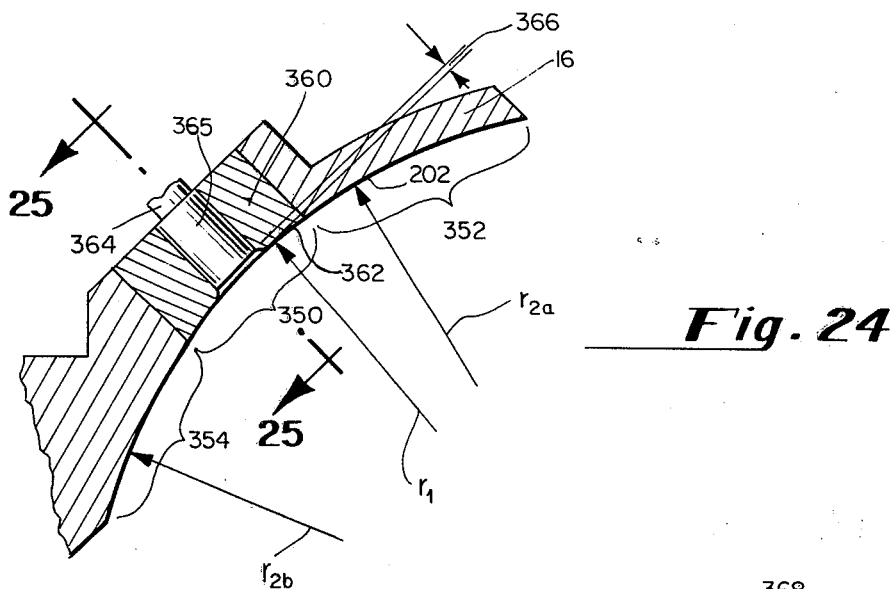
FIG. 24 is a sectional view of the head of FIG. 23 taken along line 24—24.
Figure 25:
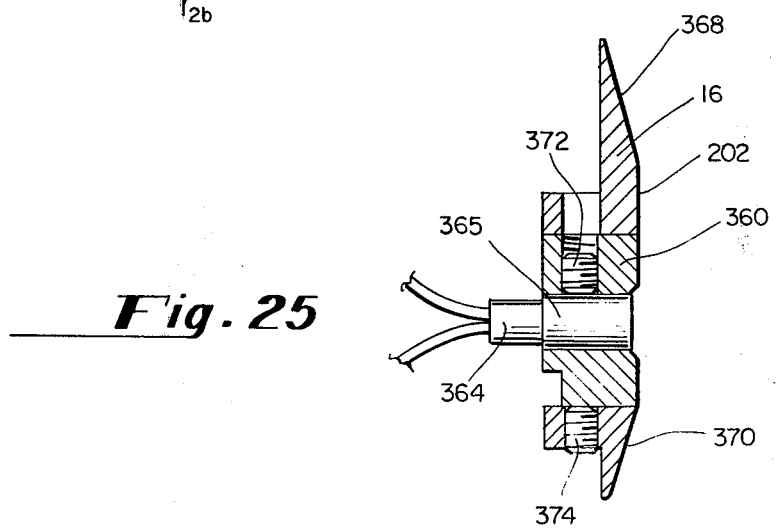
FIG. 25 is a sectional view of the head of FIG. 23 taken along line 25—25.

In the embodiment of FIGS. 23–25, the recess in the curved surface 202 shown in FIG. 6, is replaced by a wear-resistant insert 360 which extends through the head 16. The insert 360 includes a surface 502 having a radius of curvature $r_1$ so as to form the portion 350 of the surface 202 which has the same radius of curvature as the drum 12 (not shown). The adjacent portions 352 and 354 of the surface 202 have radii of curvature $r_{2a}$ and $r_{2b}$ identical to the radii of curvature shown in FIG. 15. A bundle of fiber optics 364 within a jacket 365 extends through the center of the insert 360 to a recessed point a distance 366 below or beneath the surface 362 and radially outwardly from the drum not shown. The actual distance 366 will vary depending upon the nature of the bundle of fiber optics. In general, it is preferred that the distance 366 is equal to 30–300% of the maximum cross-sectional dimension of the reading fiber optic and preferably 30–100% of that cross-sectional dimension if the fiber optic embodiment of FIGS. 16–18 is utilized.

Since the insert 360 bears upon the document carried by the drum at the surface 362, the wear-resistant nature of the insert material is particularly important. In this connection, it has been found desirable to utilize a relatively hard metal such as stainless steel. Such a metal is capable of forming a substantial seal with the document carried by the drum so as to prevent debris from passing between the insert 360 and the surface of the document thereby keeping the end of the fiber optic bundle 364 clear of any obstructions which might otherwise impair the facsimile transmission. The remainder of the head 16 may comprise a relatively soft metal such as aluminum or a suitable plastic.

As shown in FIG. 25, the surface 202 tapers away from the insert 360 at edges 368 and 370. Thus the wear-resistant surface 362 of the head 16 encounters most of the contact between the head 16 and the document on the drum. In order to maintain the fiber optic bundle 364 in their proper position with respect to the document on the drum, i.e., the proper spacing 366, the fiber optic bundle 364 is held in place by a set screw 372 which extends through the stainless steel insert 360. A set screw 374 extends through a hole in the head adjacent the edge 370 so as to firmly lock the insert 360 in place.

Although specific embodiments of the invention have been shown and described, other embodiments and modifications will occur to those of ordinary skill in the art, and the appended claims are intended to cover any such modifications which fall within the true spirit and scope of the invention.

What is claimed is:
1. A facsimile transceiver comprising:
a document/copy drum;
means for mounting said drum for rotational motion about the axis of the drum;
means for driving said drum through said rotational motion about said drum axis; and
a combination read/write head located radially outwardly of said drum for scanning along the surface of said drum in a direction parallel with said drum axis, said combination read/write head including reading means comprising a fiber optic in direct optical communication with a document on said drum for use in detecting the information content of a document when said transceiver is transmitting and writing means for writing on a copy medium when said transceiver is receiving.

2. The facsimile transceiver of claim 1 wherein said means further comprises a semiconductor light detecting device coupled to said fiber optic.

3. The facsimile transceiver of claim 2 wherein said combination read/write head further comprises illuminating means.

4. The facsimile transceiver of claim 3 wherein said illuminating means comprises a light-conducting medium substantially surrounding said fiber optic and a light source for introducing light into said light-conducting medium.

5. A facsimile transmitter comprising:
a document carrying means;
reading means for detecting the light-dark variations on a document carried by said document carrying means; and
scanning means for moving said reading means relative to said document carrying means;
said reading means comprising at least one reading fiber optic and a solid light conducting medium substantially surrounding said reading fiber optic for illuminating the area on said document juxtaposed to said reading fiber optic, said reading fiber optic and said solid light conducting medium being in optical communication with said document through a non-solid light conducting medium wherein the distance through the non-solid light conducting medium between the end of said reading fiber optic and the document carried by said document carrying means is 30% to 300% of the maximum cross-sectional dimension of said reading fiber optic.

6. The facsimile transmitter of claim 5 wherein said light conducting medium comprises at least one illuminating fiber optic having an axis inclined with respect to the axis of said reading fiber optic such that the projection of the axes intersects said document in said area juxtaposed to said reading fiber optic.

7. The facsimile transmitter of claim 5 wherein said solid light conducting medium comprises a light pipe and said fiber optic extends through a central opening in said light pipe.

8. The facsimile transmitter of claim 7 wherein the end of said light pipe adjacent said document carrying means extends beyond the end of said fiber optic adjacent said document carrying means, said light pipe having an interior surface tapering away from said fiber optic and an exterior surface tapering toward said fiber optic so as to reduce the amount of specularly reflected light entering the end of said reading fiber optic.

9. The facsimile transmitter of claim 5 wherein said light conducting medium comprises a plurality of illuminating fiber optics substantially surrounding said reading fiber optic.

10. The facsimile transmitter of claim 9 wherein said reading means comprises a plurality of reading fiber optics and said light conducting medium comprises a plurality of illuminating fiber optics interspersed with said reading fiber optics such that the majority of said reading fiber optics are substantially surrounded by said illuminating fiber optics.

11. The facsimile transmitter of claim 9 wherein said illuminating fiber optics extend beyond the end of said reading fiber optic.

12. The facsimile transmitter of claim 11 wherein the axes of said illuminating fiber optics are inclined with respect to the axis of said reading fiber optics such that the projection of said axes intersect said document in said area juxtaposed to said reading fiber optic so as to reduce the amount of specularly reflected light entering the end of said reading fiber optic.

13. A facsimile transmitter comprising:
document carrying means;
reading means for detecting the information content of a document carried by said document carrying means; and scanning means for moving said reading means relative to said document carrying means;

said reading means comprising a semiconductor light detecting device and at least one reading fiber optic extending into close proximity with said document carrying means such that the distance between a document on said document carrying means and the end of said reading fiber optic is 30% to 300% of the maximum cross-sectional dimension of said reading fiber optic, said semiconductor light-detecting device being optically coupled to said reading fiber optic.

14. The facsimile transmitter of claim 13 wherein said reading means comprises a plurality of fiber optics, said distance between a document and the end of each of said reading fiber optics being 30% to 300% of the maximum cross-sectional dimension of each of said reading fiber optics.

15. The facsimile transmitter of claim 13 wherein the distance between a document on said document carrying means and the end of said reading fiber optic is 30% to 300% of the maximum cross-sectional dimension of said reading fiber optic.

16. The facsimile transmitter of claim 13 wherein said document carrying means comprises a document carrying drum mounted for rotational motion about the axis of the drum.

17. In a facsimile transmitter comprising a document carrying drum, means for mounting said drum for rotational motion about the axis of the drum, means for driving said drum through said rotational motion about the axis of said drum, a reading head biased into contact with a document carried by the drum, and means for driving said head through a linear motion parallel with the axis of said drum while maintaining contact between said head and the document carried by the drum, said reading head including optical scanning means for detecting the information content on the document as said drum rotates and said head moves linearly along the drum, the improvement comprising:
a reading head having a curved surface adapted to contact the document carried by said drum, said surface having a first portion adjacent said optical scanning means with a radius of curvature substantially equal to the radius of curvature of said drum and a second portion spaced from said optical scanning means with a radius of curvature substantially larger than the radius of curvature of said drum such that the space between said drum and said second portion increases with increasing distance from said optical scanning means to prevent undesirable bouncing of the head as a discontinuity in document thickness passes through the area between said drum and said head.

18. The facsimile transmitter of claim 17 wherein the arc of said first portion of said surface and the arc of said second portion of said surface are substantially tangent at the junction of said first portion and said second portion of said surface.

19. The facsimile transmitter of claim 18 wherein said first portion of said surface comprises a material more wear-resistant than said second portion of said surface.

20. The facsimile transmitter of claim 17 wherein the direction of rotation of said drum brings said discontinuity in said document into contact with said second portion before bringing said discontinuity into contact with said first portion so as to prevent bouncing of said head as said discontinuity is entering the area between said head and said document.

21. The facsimile transmitter of claim 20 wherein said curved surface includes a third portion spaced from said optical scanning means, said drum having a direction of rotation so as to bring said discontinuity in said document into contact with said third portion after bringing said discontinuity into contact with said first portion, the space between said drum and said third portion increasing with increasing distance from said optical scanning means so as to prevent bouncing of said head as said discontinuity is leaving the area between said head and said document.

22. The facsimile transmitter of claim 21 wherein said optical scanning means comprises a fiber optic in optical communication with said document carried by said drum, the end of said fiber optic being recessed a fixed distance from said curved surface at said first portion thereon.

23. The facsimile transmitter of claim 22 wherein said head includes a recess in said first portion of said curved surface, said end of said fiber optic protruding from an opening through the base of said recess.

24. In a facsimile transmitter comprising a document carrying drum, means for mounting said drum for rotational motion about the axis of the drum, means for driving said drum through said rotational motion about the axis of said drum, a reading head biased into contact with a document carried by the drum, and means for driving said head through a linear motion parallel with the axis of said drum while maintaining contact between said head and the document carried by said drum, said reading head including an optical means for detecting the information content on the document as said drum rotates and said head moves linearly along said drum, the improvement comprising:
a reading head having a curved surface generally conforming with the surface of said drum, said curved surface making contact with said drum in the vicinity of said optical scanning means and being spaced from said drum at locations more remote from said optical scanning means so as to prevent bouncing of said head when a discontinuity in document thickness passes through the area between said curved surface and said head.

25. The facsimile transmitter of claim 24 wherein said curved surface has a radius of curvature substantially equal to the radius of curvature of said drum in the vicinity of said optical scanning means and a radius of curvature substantially larger than the radius of curvature of said drum in the areas of said curved surface more remote from said optical scanning means.

26. In a facsimile system comprising a document carrying drum, means for mounting said drum for rotational motion about the axis of said drum, means for driving said drum through said rotational motion about the axis of said drum, a reading head biased into contact with a document carried by said drum, and means for driving said head through a linear motion parallel with the axis of said drum while maintaining contact between said head and the document carried by said drum, said reading head including a surface biased against said drum and including optical scanning means mounted in said head, the improvement comprising:
an optical scanning means comprising a fiber optic in optical communication with a document carried by said drum at said surface of said head, said surface including a recess having a base with an opening receiving said fiber optic, said fiber optic protruding from the base of said recess through said opening while being spaced from said curved surface within said recess.

27. The facsimile system of claim 26 wherein said fiber optic transmits light reflected from the surface of the document, the spacing between said surface and the end of said fiber optic being 30% to 300% of the maximum cross-sectional dimension of said fiber optic.

28. A facsimile transmitter comprising:
a document carrying means;
reading means for detecting the light-dark variations on a document carried by said document carrying means;
scanning means for moving said reading means relative to said document carrying means; and
said reading means comprising at least one reading fiber optic and a plurality of illuminating fiber optics wherein the axes of said illuminating fiber optics are inclined with respect to the axis of said reading fiber optic so as to illuminate the information-bearing area of said document juxtaposed to the end of said reading fiber optic.

29. The transmitter of claim 28 wherein the angle of inclination of said illuminating fiber optic axes is more than 0° and less than 44° with respect to said reading fiber optic axis.

30. The facsimile transmitter of claim 28 wherein the end of said reading fiber optic is spaced from said document carrying means such that the distance between the document on said document carrying means and the end of said reading fiber optic is 30%–100% of the maximum cross-sectional dimension of said reading fiber optic.

31. The facsimile transmitter of claim 28 wherein the end of said reading fiber optic and the ends of said illuminating fiber optics are substantially coplanar so as to form substantially elliptical surfaces at the end of said illuminating fiber optics.

32. The facsimile transmitter of claim 31 wherein said illuminating fiber optics are substantially tangent to said reading fiber optic.

33. The facsimile transmitter of claim 28 wherein said reading means further comprises an outer holder having a radially inwardly tapering surface in a central opening extending therethrough and an inner holder having an outer radially inwardly tapering surface and a central opening extending therethrough, said inner holder being inserted in the central opening of said outer holder with said radially inwardly tapering surface of said inner holder juxtaposed to said radially inwardly tapering surface of said outer holder, said illuminating fiber optic extending through the central opening of said outer holder between said radially inwardly tapering surface of said outer holder and said radially inwardly tapering surface of said inner holder so as to maintain said axes inclined with respect to said illuminating fiber optics, said reading fiber optic extending through said central opening of said inner holder.

34. The facsimile transmitter of claim 33 wherein said reading means further comprises an adhesive within said central opening of said outer holder and said central opening of said inner holder so as to adhesively bond said illuminating fiber optics and said reading fiber optics in place.

35. A facsimile transmitter comprising:

document carrying means;
reading means for detecting the light-dark variations on a document carried by said document carrying means; and
scanning means for moving said reading means relative to said document carrying means;
said reading means comprising a bundle of fiber optics including a plurality of reading fiber optics and a plurality of illuminating fiber optics, each of said reading fiber optics being substantially surrounded by illuminating fiber optics adjacent said document carrying means.

36. The facsimile transmitter of claim 35 wherein said reading fiber optics are clustered centrally within said bundle so as to form an aperture having a predetermined configuration.

37. The facsimile transmitter of claim 36 wherein said configuration of said aperture is substantially circular.

38. The facsimile transmitter of claim 36 wherein said configuration of said aperture is substantially rectangular.

39. The facsimile transmitter of claim 36 wherein said configuration of said aperture is substantially triangular.

40. A facsimile transmitter comprising a document carrying drum, means for mounting said drum for rotational motion about the axis of the drum, means for driving said drum through said rotational motion about the axis of said dru, a reading head biased into contact with a document carried by the drum, and means for driving said head through a linear motion parallel with the axis of said drum while maintaining contact between said head and said document carried by said drum, said reading head including an optical means for detecting the information content on the document as said drum rotates and said head moves linearly along said drum, the improvement comprising:
a reading head having a curved surface generally conforming with the surface of said drum and adapted to be in substantially continuous sealing contact with the document carried by said drum, said optical scanning means being in optical communication with said document through an opening in said curved surface, said sealing contact substantially preventing debris from entering said opening.

41. The facsimile transmitter of claim 40 wherein said optical scanning means comprises fiber optic means having an end recessed within said opening.

42. The facsimile transmitter of claim 40 wherein said curved surface comprises a wear-resistant material.

43. The facsimile transmitter of claim 40 wherein only a portion of said curved surface is in continuous contact with said drum.

44. The facsimile transmitter of claim 43 wherein said portion of said curved surface is more wear resistant than another portion of said curved surface of said head juxtaposed to but not in continuous contact with said document on said drum.

45. A facsimile transmitter comprising:
document carrying means;
reading means for detecting the light-dark variations on a document carried by said document carrying means; and
scanning means for moving said reading means relative to said document carrying means;

said reading means comprising at least one reading fiber optic and a light pipe substantially surrounding the reading fiber optic for illuminating the area on said document juxtaposed to said reading fiber optic, the end of said light pipe adjacent said document carrying means extending beyond the end of said fiber optic adjacent said document carrying means, said light pipe having an interior surface tapering away from said fiber optic and an exterior surface tapering toward said fiber optic so as to reduce the amount of specularly reflected light entering the end of said reading fiber optic, the distance between the end of said reading fiber optic and the document carried by said document carrying means being 30% to 300% of the maximum cross-sectional dimension of said reading fiber optic.

46. A facsimile transmitter comprising:
a document carrying drum;
means for mounting said drum for rotational motion about said drum axis;
means for driving said drum through said rotational motion about said drum axis;
a reading head;
means for supporting said reading head for movement along the surface of said drum in a direction parallel to said axis of said drum;
a reading fiber optic mounted in a fixed position on said head for detecting the information content on a document carried by said drum; and
means for biasing said head into contact with said drum to allow said head to ride on the document carried by said drum thereby maintaining a fixed distance between said document and said fiber optic scanning means;
said head maintaining a substantially constant spacing between the document and the reading fiber optic of 30% to 300% of the maximum cross-sectional dimension of said reading fiber optic.

47. The facsimile transmitter of claim 46 comprising a light conductive medium substantially surrounding said fiber optic.

48. The facsimile transmitter of claim 47 wherein said light conducting medium comprises a light pipe and said fiber optic extends through a central opening in said light pipe.

49. The facsimile transmitter of claim 47 wherein said light conducting medium comprises a plurality of illuminating fiber optics substantially surrounding said reading fiber optic.

50. The facsimile transmitter of claim 49 wherein the axes of said illuminating fiber optics are inclined with respect to the axis of said reading fiber optic such that the projection of said axes intersect the document in the area juxtaposed to said reading fiber optic.

51. The facsimile transmitter of claim 50 wherein the end of said reading fiber optic and the ends of said illuminating fiber optics are substantially coplanar so as to form substantially elliptical surfaces at the end of said illuminating fiber optics.

52. The facsimile transmitter of claim 50 wherein said illuminating fiber optics are substantially tangent to said reading fiber optic.

53. In a facsimile system comprising a document carrying drum, means for mounting said drum for rotational motion about the axis of said drum, means for driving said drum through said rotational motion about the axis of said drum, a reading head biased into contact with the document carried by said drum, and means for driving said head through a linear motion parallel with the axis of said drum while maintaining contact between said head and the document carried by said drum, said reading head including a surface biased against said drum and including optical scanning means mounted in said head, the improvement comprising:
an optical scanning means comprising a reading fiber optic in optical communication with a document carried by said drum at the surface of said head and a plurality of illuminating fiber optics inclined with respect to the axis of and substantially surrounding said reading fiber optic, said surface including a recess having a base with an opening receiving said fiber optic, said fiber optic protruding from the base of said recess through said opening while being spaced from said surface within said recess, the ends of said illuminating fiber optics being substantially coplanar so as to form substantially elliptical surfaces at the end of said illuminating fiber optics.

54. The facsimile system of claim 53 wherein said fiber optic transmits light reflected from the surface of the document, the spacing between said surface and the end of said fiber optic being 30% to 300% of the maximum cross-sectional dimension of said fiber optic.

55. A facsimile transmitter comprising:
document carrying means;
reading means for detecting the light variations on a document carried by said document carrying means; and
scanning means for moving said reading means relative to said document carrying means;
said reading means comprising a bundle of fiber optics including a plurality of reading fiber optics and a plurality of illuminating fiber optics randomly interspersed among said reading fiber optics.

56. The facsimile transmitter of claim 55 wherein the spacing between the end of said reading fiber optics and a document carried by said document carrying means is 30–100% of the diameter of one of said reading fiber optics.

57. A facsimile transmitter comprising:
document carrying means;
reading means in contact with a document;
scanning means for moving said reading means relative to said document carrying means;
said reading means comprising a reading fiber optic having an end juxtaposed to and in optical communication with said document carrying means, said end of said fiber optic being recessed with respect to the area of contact with said document by a distance of 30% to 300% of the maximum cross-sectional dimension of said reading fiber optic.

58. The facsimile transmitter of claim 57 wherein said carrying means comprises a drum and the end of said fiber optic is radially outwardly displaced with respect to said drum.

59. The facsimile transmitter of claim 57 wherein said reading means comprises illuminating fiber optics substantially surrounding said reading fiber optic, the ends of said illuminating fiber optic also being recessed with respect to the area of contact with the document.

60. A facsimile transmitter comprising:
document carrying means;
reading means in contact with a document;

scanning means for moving said reading means relative to said document carrying means;

said reading means comprising a fiber optic having an end juxtaposed to and in optical communication with said document and a solid light conducting medium substantially surrounding said reading fiber optic so as to form an opening receiving said end of said reading fiber optic, the distance between said reading fiber optic and the document carried by said document carrying means being 30% to 300% of the maximum cross-sectional dimension of said opening.

61. The facsimile transmitter of claim 60 wherein said solid light conducting medium comprises a plurality of illuminating fiber optics.

62. The facsimile transmitter of claim 61 wherein said illuminating fiber optics are substantially tangent to said reading fiber optic.

63. The facsimile transmitter of claim 61 wherein the axes of said illuminating fiber optics are inclined with respect to the axis of said reading fiber optic such that the projection of said axes intersects the document in the area juxtaposed to the end of said reading fiber optic.

64. A facsimile transmitter comprising:
document carrying means;
reading means in contact with a document;
scanning means for moving said reading means relative to said document carrying means;
said reading means comprising
a head including a recess therein having a periphery thereof in substantial sealing contact with the document; and
a reading fiber optic means having an end juxtaposed to and in optical communication with the document, said end of said fiber optic means being located within said recesses such that the end is spaced from the document by a distance of 30% to 300% of the maximum cross-sectional dimension of said reading fiber optic means.

65. The facsimile transmitter of claim 64 wherein said reading means further comprises illuminating fiber optics substantially surrounding said reading fiber optic, the ends of said illuminating fiber optics being located within said recess such that said end is spaced from the document.

66. The facsimile transmitter of claim 65 wherein the ends of said illuminating fiber optics are spaced from the document by a distance of 30% to 300% of the maximum cross-sectional dimension of said reading fiber optic.

67. A facsimile transmitter comprising:
document carrying means;
reading means for detecting the light-dark variations on a document carried by said document carrying means; and
scanning means for moving said reading means relative to said document carrying means;
said reading means comprising fiber optic means and a solid light conducting medium substantially surrounding said fiber optic means for illuminating the area on said document juxtaposed to said reading fiber optic means said reading fiber optic means and said solid light conducting medium being in optical communication with said document through a non-solid light conducting medium wherein the distance through the non-solid light conducting medium between the end of said reading fiber optic and a document carried by said document carrying means is 30% to 300% of the maximum cross-sectional dimension of said reading fiber optic.

68. A facsimile transmitter comprising:
document carrying means;
reading means for detecting the information content of a document carried by said document carrying means; and
scanning means for moving said reading means relative to said document carrying means;
said reading means comprising a semi-conductor light detecting device and reading fiber optic means extending into close proximity with said document carrying means such that the distance between a document on said document carrying means and the end of said reading fiber optic means is 30% to 300% of the maximum cross-sectional dimension of said reading fiber optic means, said semi-conductor light detecting device being optically coupled to said reading fiber optic.

69. A facsimile transmitter comprising:
a document carrying drum;
means for mounting said drum for rotational motion about said drum axis;
means for driving said drum through said rotational motion about said drum axis;
a reading head;
means for supporting said reading head for movement along the surface of said drum in a direction parallel to said axis of said drum;
reading fiber optic means mounted in a fixed position on said head for detecting the information content on a document carried by said drum; and
means for biasing said head into contact with said drum to allow said head to ride on the document carried by said drum thereby maintaining a fixed distance between said document and said fiber optic scanning means;
said head maintaining a substantially constant spacing between the document and the reading fiber optic means of 30% to 300% of the maximum cross-sectional dimension of said reading fiber optic means.

70. A facsimile transmitter comprising:
document carrying means;
reading means in contact with a document;
scanning means for moving said reading means relative to said document carrying means;
said reading means comprising fiber optic means having an end juxtaposed to and in optical communication with said document carrying means, said end of said fiber optic means being recessed with respect to the area of contact with said document by a distance of 30% to 300% of the maximum cross-sectional dimension of said reading fiber optic means.

71. A facsimile transmitter comprising:
document carrying means;
reading means for detecting the light-dark variations on the document carried by said document carrying means; and
scanning means for moving said reading means relative to said document carrying means;
said reading means comprising at least one reading fiber optic and a plurality of illuminating fiber optics substantially surrounding said reading fiber optic for illuminating the area on said document juxtaposed to said reading fiber optic, said illuminating fiber optic extending beyond the end of said reading fiber optic, the distance between the end of said reading fiber optic and the document carried by said document carrying means is 30% to 300% of the maximum cross-sectional dimension of said reading fiber optic.

72. A facsimile transmitter comprising:

document carrying means;

reading means for detecting the light-dark variations on a document carried by said document carrying means; and scanning means for moving said reading means relative to said document carrying means; said reading means comprising at least one reading fiber optic and a plurality of illuminating fiber optics substantially surrounding said reading fiber optic for illuminating the area on said document juxtaposed to said reading fiber optic, the axes of said illuminating fiber optics being inclined with respect to the axis of said reading fiber optic such that the projection of said axes intersects said document in said area juxtaposed to said reading fiber optic, the distance between the end of said reading fiber optic and the document carried by said document carrying means being 30% to 300% of the maximum cross-sectional dimension of said reading fiber optic.

* * * * *